US010165501B2

(12) United States Patent
Fong et al.

(10) Patent No.: US 10,165,501 B2
(45) Date of Patent: *Dec. 25, 2018

(54) MEDIUM ACCESS CONTROL FOR WIRELESS SYSTEMS

(71) Applicant: APPLE INC., Cupertino, CA (US)

(72) Inventors: Mo-Han Fong, L'Orignal (CA); Hang Zhang, Nepean (CA); Robert Novak, Ottawa (CA)

(73) Assignee: APPLE INC., Cupertino, CA (US)

( * ) Notice: Subject to any disclaimer, the term of this patent is extended or adjusted under 35 U.S.C. 154(b) by 244 days.

This patent is subject to a terminal disclaimer.

(21) Appl. No.: 14/733,656

(22) Filed: Jun. 8, 2015

(65) Prior Publication Data

US 2015/0304943 A1 Oct. 22, 2015

Related U.S. Application Data

(63) Continuation of application No. 13/855,056, filed on Apr. 2, 2013, now Pat. No. 9,055,454, which is a
(Continued)

(51) Int. Cl.
*H04W 48/16* (2009.01)
*H04L 29/06* (2006.01)
(Continued)

(52) U.S. Cl.
CPC .......... *H04W 48/16* (2013.01); *H04L 63/162* (2013.01); *H04W 8/26* (2013.01); *H04W 24/00* (2013.01);
(Continued)

(58) Field of Classification Search
CPC .. H04L 29/12; H04L 29/12009; H04W 24/00; H04W 52/262; H04W 48/16;
(Continued)

(56) References Cited

U.S. PATENT DOCUMENTS 8,416,746 B2 * 4/2013 Fong .................... H04L 63/162
370/332
8,855,073 B2 * 10/2014 Han .................... H04W 74/002
370/329
(Continued)

FOREIGN PATENT DOCUMENTS

CN 101174923 5/2008
CN 101461272 6/2009
(Continued)

OTHER PUBLICATIONS

"MAC Addressing Scheme for 802.16m"; IEEE C802.16m-08/575r1; Jul. 12, 2008; Chen et al.*
(Continued)

*Primary Examiner* — Benjamin H Elliott, IV
(74) *Attorney, Agent, or Firm* — Fay Kaplun & Marcin, LLP

(57) ABSTRACT

A method for execution by a mobile station (MS) in a mobile communications network, the method comprising: receiving a first MS identifier from the network during a ranging operation involving the MS; using the first MS identifier to extract the contents of at least one message received from the network during said ranging operation; using a second MS identifier, different from the first MS identifier, to extract the contents of at least one message received from the network after said ranging operation is complete. Also, a method for execution by the base station, comprising: outputting a first message destined for the MS, the first message including a first identifier for use by the MS during a ranging operation; determining that said ranging operation is complete; outputting a second message destined for the MS, the second message including a second identifier for use by the MS in subsequent communication with the network.

21 Claims, 22 Drawing Sheets

Related U.S. Application Data continuation of application No. 12/831,058, filed on Jul. 6, 2010, now Pat. No. 8,416,746, which is a continuation-in-part of application No. 12/806,179, filed on Jul. 6, 2009, now abandoned.

(60) Provisional application No. 61/078,570, filed on Jul. 7, 2008, provisional application No. 61/223,134, filed on Jul. 6, 2009.

(51) Int. Cl.
*H04W 8/26* (2009.01)
*H04W 52/26* (2009.01)
*H04W 24/00* (2009.01)
*H04W 74/00* (2009.01)

(52) U.S. Cl.
CPC .......... *H04W 52/262* (2013.01); *H04W 74/00* (2013.01)

(58) Field of Classification Search
CPC ....... H04W 74/00; H04W 8/26; H04W 48/00; H04W 48/08; H04W 8/265; H04W 74/002; H04W 76/00; H04W 76/201
See application file for complete search history.

(56) References Cited

U.S. PATENT DOCUMENTS

| | | | | |
|---|---|---|---|---|
| 9,055,454 B2* | 6/2015 | Fong | .................... | H04L 63/162 |
| 2005/0041573 A1* | 2/2005 | Eom | ................ | H04W 74/0866 |
| | | | | 370/208 |
| 2005/0192011 A1* | 9/2005 | Hong | .................... | H04W 36/12 |
| | | | | 455/440 |
| 2006/0094450 A1* | 5/2006 | Park | .................. | H04W 52/0225 |
| | | | | 455/458 |
| 2006/0203712 A1 | 9/2006 | Lim et al. | | |
| 2006/0227754 A1* | 10/2006 | Ko | ....................... | H04W 24/08 |
| | | | | 370/338 |
| 2008/0175246 A1* | 7/2008 | Kunhappan | ....... | H04L 29/12254 |
| | | | | 370/392 |
| 2008/0250160 A1* | 10/2008 | Hall | .................. | H04L 29/12264 |
| | | | | 710/3 |
| 2008/0268844 A1* | 10/2008 | Ma | .................... | H04W 36/0033 |
| | | | | 455/436 |
| 2008/0273610 A1* | 11/2008 | Malladi | ................. | H04L 1/0029 |
| | | | | 375/260 |
| 2009/0034526 A1* | 2/2009 | Ahmadi | ................ | H04W 28/06 |
| | | | | 370/392 |
| 2009/0103487 A1* | 4/2009 | Oh | ...................... | H04W 72/042 |
| | | | | 370/329 |
| 2009/0111479 A1 | 4/2009 | Yamaguchi et al. | | |
| 2009/0262681 A1* | 10/2009 | Park | .................. | H04W 74/0866 |
| | | | | 370/328 |
| 2010/0112999 A1* | 5/2010 | Eskicioglu | ........ | H04W 36/0083 |
| | | | | 455/422.1 |
| 2010/0169751 A1* | 7/2010 | Sun | ....................... | H04L 1/0072 |
| | | | | 714/807 |
| 2012/0307760 A1* | 12/2012 | Han | ........................ | H04L 5/001 |
| | | | | 370/329 |
| 2014/0092885 A1* | 4/2014 | Venkatachalam | ... | H04W 76/023 |
| | | | | 370/338 |

FOREIGN PATENT DOCUMENTS

| | | |
|---|---|---|
| EP | 1 916 862 | 4/2008 |
| JP | 2006-254461 | 9/2006 |
| JP | 2009-111929 | 5/2009 |
| WO | 2007/129198 | 11/2007 |
| WO | 2009/054773 | 4/2009 |
| WO | 2011/003195 | 1/2011 |

OTHER PUBLICATIONS

"Proposal for IEEE 802.16m MAC Addressing"; IEEE 802.16 Broadband Wireless Access Working Group; Jul. 2, 2008, Hartman et al.*

3$^{rd}$ Generation Partnership Project; Technical Specification Group Radio Access Network; Evolved Universal Terrestrial Radio Access (E-UTRA) Medium Access Control (Mac) protocol specification;(Release 8); 3GPP TS 36.321 V8.6.0 (Jun. 10, 2009).

"IEEE Standard for Local and metropolitan area networks Part 16: Air Interface for Broadband Wireless Access Systems;IEEE Std 802.16-2009 (Revision of IEEE Std 802.16-2004)", IEEE Standard, IEEE, Piscataway, NJ, USA, May 29, 2009 (May 29, 2009), pp. 1-2080, XP068045637, DOI: 10.1109/IEEESTD.2009.5062485 ISBN: 978-0-7381-5919-5.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP Standard; 3GPP TS 36.300, 3rd Generation Partnership Project (3GPP), Mobile Competence Centre; 650, Route Des Lucioles ; F-06921 Sophia-Antipolis Cedex ; France, No. V9.0.0, Jun. 1, 2009 (Jun. 1, 2009), pp. 1-157, XP050377586.

* cited by examiner

MEDIUM ACCESS CONTROL FOR WIRELESS SYSTEMS

CROSS-REFERENCE TO RELATED APPLICATIONS

This application claims the benefit of U.S. provisional patent application No. 61/223,134 filed on Jul. 6, 2009, which is hereby incorporated by reference in its entirety.

This application is a continuation-in-part of the non-provisional application (serial number tbd) resulting from conversion under 37 C.F.R. § 1.53(c)(3) of U.S. provisional patent application No. 61/223,134 filed on Jul. 6, 2009, which claims the benefit of U.S. provisional patent application No. 61/078,570 filed on Jul. 7, 2008.

MICROFICHE APPENDIX

Not applicable.

TECHNICAL FIELD

This application relates to wireless communication techniques.

BACKGROUND

Draft IEEE 802.16m System Description Document, IEEE 802.16m-08/003r1, dated Apr. 15, 2008, states that: "This [802.16m] standard amends the IEEE 802.16 WirelessMAN-OFDMA specification to provide an advanced air interface for operation in licensed bands. It meets the cellular layer requirements of IMT-Advanced next generation mobile networks. This amendment provides continuing support for legacy WirelessMAN-OFDMA equipment . . . The purpose of this standard is to provide performance improvements necessary to support future advanced services and applications, such as those described by the ITU in Report ITU-R M.2072."

Also, IEEE 802.16m System Requirements Document, IEEE 802.16m-07/002r4), states that: "Overhead, including overhead for control signaling as well as overhead related to bearer data transfer, for all applications shall be reduced as far as feasible without compromising overall performance and ensuring proper support of systems features."

SUMMARY

According to a first broad aspect, the present invention seeks to provide a method for execution by a mobile station in a mobile communications network, the method comprising: receiving a first mobile station identifier from the network during a ranging operation involving the mobile station; using the first mobile station identifier to extract the contents of at least one message received from the network during said ranging operation; using a second mobile station identifier, different from the first mobile station identifier, to extract the contents of at least one message received from the network after said ranging operation is complete.

According to a second broad aspect, the present invention seeks to provide a mobile station comprising: receive circuitry configured for receiving messages from a network, at least one of the messages received during a ranging operation and comprising a first mobile station identifier; a processing entity configured for extracting the contents of at least one message received from the network during said ranging operation based on the first mobile station identifier and for extracting the contents of at least one message received from the network after said ranging operation is complete based on a second mobile station identifier different from the first mobile station identifier.

According to a third broad aspect, the present invention seeks to provide a computer-readable storage medium comprising computer-readable instructions which, when executed by a computing entity in a mobile station, cause the mobile station to: extract the contents of at least one message received from a network during a ranging operation based on using a first mobile station identifier; and extract the contents of at least one message received from the network after said ranging operation is complete based on using a second mobile station identifier different from the first mobile station identifier.

According to a fourth broad aspect, the present invention seeks to provide A mobile station comprising: means for receiving messages from a network, at least one of the messages received during a ranging operation and comprising a first mobile station identifier; means for extracting the contents of at least one message received from the network during said ranging operation based on the first mobile station identifier; and means for extracting the contents of at least one message received from the network after said ranging operation is complete based on a second mobile station identifier different from the first mobile station identifier.

According to a fifth broad aspect, the present invention seeks to provide A method for execution by a base station in a mobile communications network, comprising: outputting a first message destined for a mobile station, the first message including a first mobile station identifier for use by the mobile station during a ranging operation; determining that said ranging operation is complete; outputting a second message destined for the mobile station, the second message including a second mobile station identifier for use by the mobile station in subsequent communication with the network.

According to a sixth broad aspect, the present invention seeks to provide A base station comprising: transmit circuitry configured for outputting messages destined for a mobile station; a processing entity configured for determining when a ranging operation involving a mobile station is complete, for inserting into a first one messages transmitted during the ranging operation a first mobile station identifier for use by the mobile station during said ranging operation, and for inserting into a second one of the messages a second mobile station identifier for use by the mobile station after said ranging operation is complete.

According to a seventh broad aspect, the present invention seeks to provide A computer-readable storage medium comprising computer-readable instructions which, when executed by a computing entity in a base station, cause the base station to: insert into a first message destined for a mobile station involved in a ranging operation a first mobile station identifier for use by the mobile station during said ranging operation; and insert into a second message destined for the mobile station a second mobile station identifier for use by the mobile station after said ranging operation is complete.

According to an eighth broad aspect, the present invention seeks to provide a base station comprising: means for outputting messages destined for a mobile station; means for determining when a ranging operation involving a mobile station is complete; means for inserting into a first one messages transmitted during the ranging operation a first mobile station identifier for use by the mobile station during said ranging operation; and means for inserting into a second one of the messages a second mobile station identifier for use by the mobile station after said ranging operation is complete.

According to a ninth broad aspect, the present invention seeks to provide A method for data transmission, comprising: accessing a memory to obtain an amount of data associated with a service flow established with a recipient and to be transmitted thereto; accessing the memory to obtain control information characterizing the service flow; formulating a datagram by placing at least some of the data into a payload of the datagram and placing, in a header of the datagram, the control information characterizing the service flow, wherein the control information characterizing the service flow occupies a fewer than sixteen bits of the header; modulating a radio frequency signal with the datagram and releasing the radio frequency signal over a wireless medium.

Other aspects and features of the present application will become apparent to those ordinarily skilled in the art upon review of the following description of specific embodiments of a disclosure in conjunction with the accompanying drawing figures and appendices.

BRIEF DESCRIPTION OF THE DRAWINGS

Embodiments of the present application will now be described, by way of example only, with reference to the accompanying drawing figures, wherein like reference numerals are used in different figures to denote similar elements.

It is to be expressly understood that the description and drawings are only for the purpose of illustration of certain embodiments of the invention and are an aid for understanding. They are not intended to be a definition of the limits of the invention.

DETAILED DESCRIPTION

In the present disclosure, reference has been made to IEEE 802.16 and IEEE 802.16m. In the below, the term "IEEE 802.16" is meant to encompass versions of IEEE Std 802.16-, including but not limited to IEEE Std 802.16-2004 and -2009, while the term "IEEE 802.16m" is meant to encompass versions of IEEE 802.16m-08, including but not limited to 802.16m-08/003r3, and /003r1 and /003r9a. All of the foregoing documents, which are hereby incorporated by reference herein, are available from the IEEE, 3 Park Avenue, New York, N.Y. 10016-5997, USA, and can be consulted to in order to obtain additional background information as to the context in which certain embodiments of the present invention may find application.

Figure 1:
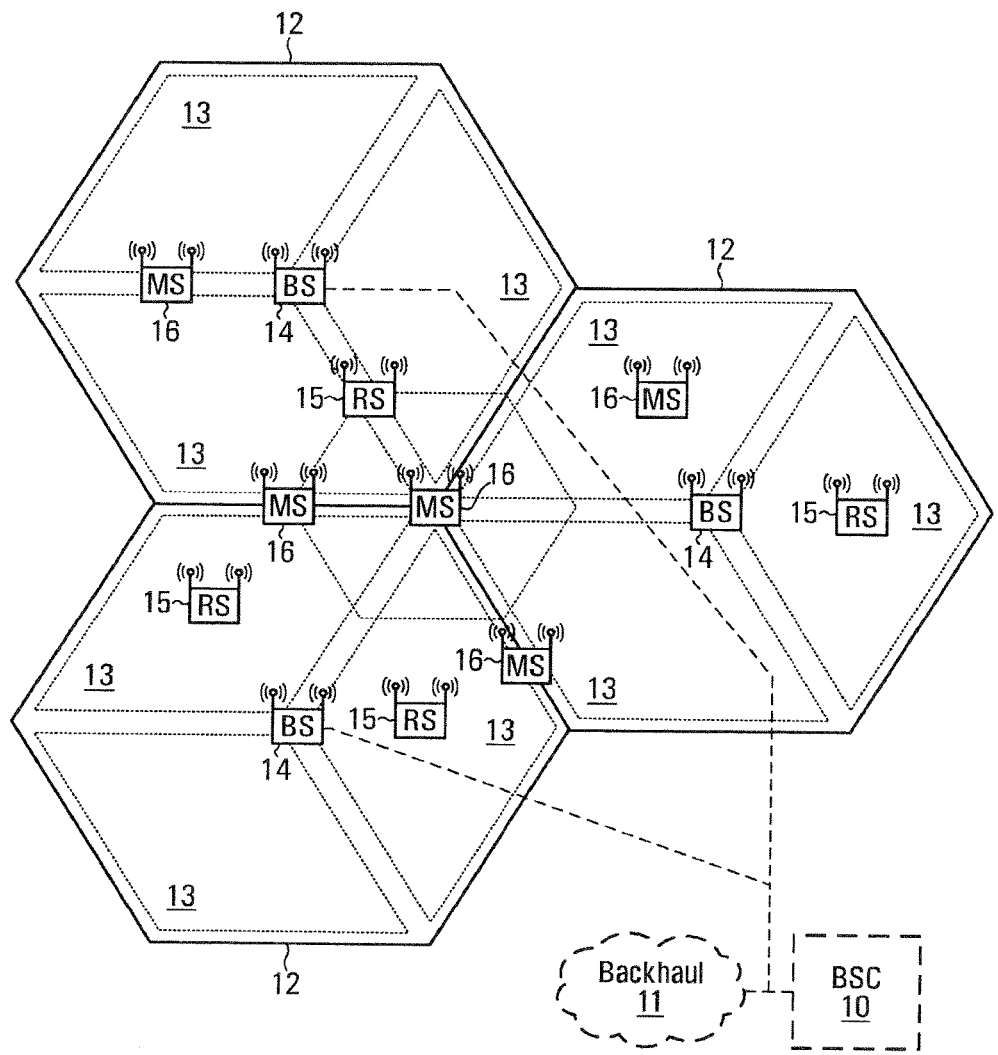
FIG. 1 is a block diagram of a cellular communication system.

Referring to the drawings, FIG. 1 shows a base station controller (BSC) 10 which controls wireless communications within multiple cells 12, which cells are served by corresponding base stations (BSs) 14. In some configurations, each cell is further divided into multiple sectors 13 or zones (not shown). In general, each BS 14 facilitates communications with mobile stations (MSs) 16, which are within the cell 12 associated with the corresponding BS 14. The MSs 16 can alternatively be referred to as mobile terminals, wireless stations, wireless terminals, subscriber stations, subscriber terminals, etc.

The movement of the MSs 16 in relation to the BSs 14 results in significant fluctuation in channel conditions. As illustrated, the BSs 14 and MSs 16 may include multiple antennas to provide spatial diversity for communications. In some configurations, relayes (or relay stations—RSs) 15 may assist in communications between BSs 14 and MSs 16. MSs 16 can be handed off 18 from any cell 12, sector 13, zone (not shown), BS 14 or RS 15 to an other cell 12, sector 13, zone (not shown), BS 14 or RS 15. In some configurations, BSs 14 communicate with each and with another network (such as a core network or the internet, both not shown) over a backhaul network 11. In some configurations, a BSC 10 is not needed.

Figure 2:
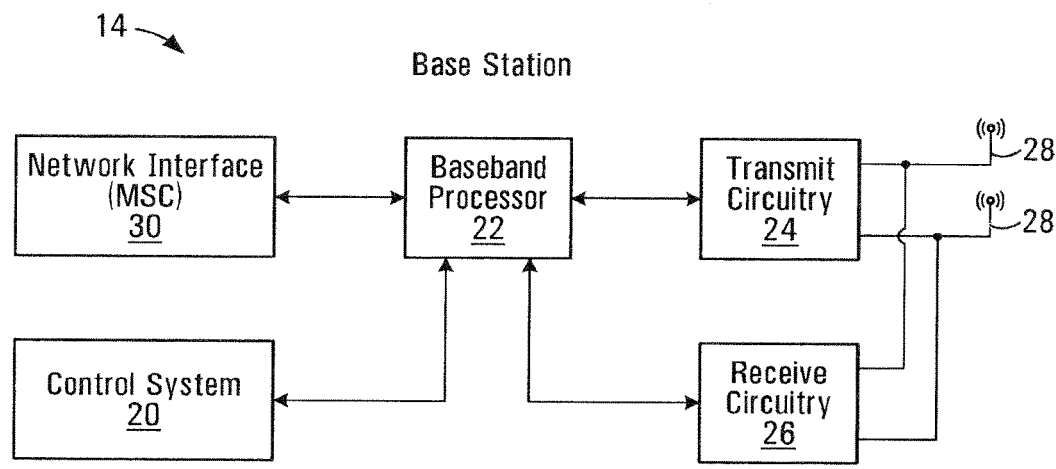
FIG. 2 is a block diagram of an example base station that might be used to implement some embodiments of the present 5 application.

With reference to FIG. 2, an example of a BS 14 is illustrated. The BS 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by MSs 16 (illustrated in FIG. 3) and RSs 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another MS 16 serviced by the BS 14, either directly or with the assistance of a RS 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
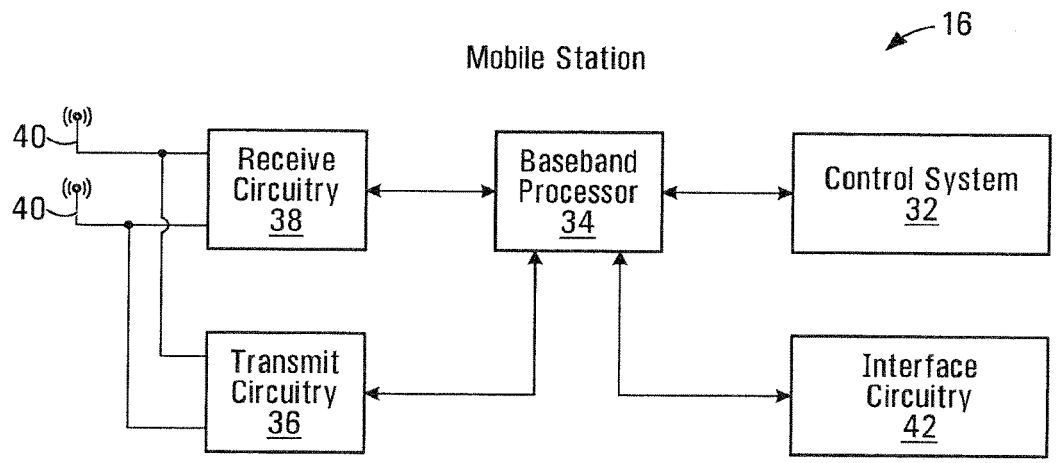
FIG. 3 is a block diagram of an example wireless terminal that might be used to implement some embodiments of the present application.

With reference to FIG. 3, an example of a MS 16 is illustrated. Similarly to the BS 14, the MS 16 will include a control system 32, a baseband processor 34, transmit circuitry 36, receive circuitry 38, multiple antennas 40, and user interface circuitry 42. The receive circuitry 38 receives radio frequency signals bearing information from one or more BSs 14 and RSs 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In orthogonal frequency division multiplexing (OFDM) modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Orthogonal Frequency Division Multiple Access (OFDMA) is a multi-user version of the OFDM digital modulation scheme. Multiple access is achieved in OFDMA by assigning subsets of subcarriers to individual users. This allows simultaneous low data rate transmission from several users. Like OFDM, OFDMA employs multiple closely spaced sub-carriers, but the sub-carriers are divided into groups of sub-carriers. Each group is named a sub-channel. The sub-carriers that form a sub-channel need not be adjacent. In the downlink, a sub-channel may be intended for different receivers. In the uplink, a transmitter may be assigned one or more sub-channels. Sub-channelization defines sub-channels that can be allocated to MSs depending on their channel conditions and data requirements. Using sub-channelization, within the same time slot a BS can allocate more transmit power to user devices (MSs) with lower SNR (Signal-to-Noise Ratio), and less power to user devices with higher SNR. Sub-channelization also enables the BS to allocate higher power to sub-channels assigned to indoor MSs resulting in better in-building coverage. Sub-channelization in the uplink can save a user device transmit power because it can concentrate power only on certain sub-channel(s) allocated to it. This power-saving feature is particularly useful for battery-powered user devices.

In operation, OFDM can be used for at least downlink (DL) transmission from the BSs 14 to the MSs 16. Each BS 14 is equipped with "n" transmit antennas 28 (n$>=$1), and each MS 16 is equipped with "m" receive antennas 40 (m$>=$1). Notably, the respective antennas can be used for reception and transmission using appropriate duplexers or switches and are so labelled only for clarity. (When RSs 15 are used, OFDM may be used for downlink transmission from the BSs 14 to the RSs 15 and from RSs 15 to the MSs 16.)

In the uplink direction, the MS 16 may use the OFDMA digital modulation scheme. (When RSs 15 are used, OFDMA may be used for uplink transmission from the BSs 14 to the RSs 15 and from RSs 15 to the MSs 16.)

It should be appreciated that the choice of OFDM in the downlink and OFDMA in the uplink is by no means limiting, and that other modulation schemes could be used.

Figure 4:
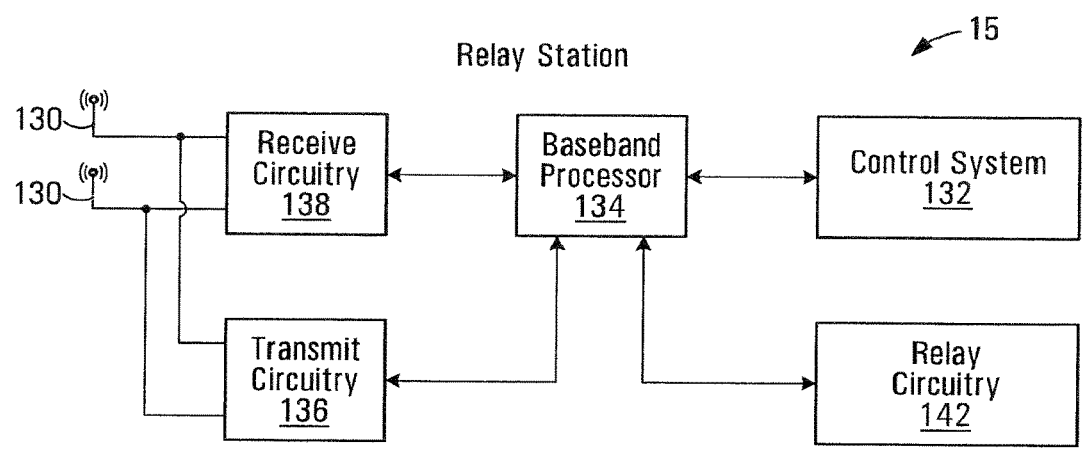
FIG. 4 is a block diagram of an example relay station that might be used to implement some embodiments of the present application.

With reference to FIG. 4, an example of a RS 15 is illustrated. Similarly to the BS 14, and the MS 16, the RS 15 will include a control system 132, a baseband processor 134, transmit circuitry 136, receive circuitry 138, multiple antennas 130, and relay circuitry 142. The relay circuitry 142 enables the RS 15 to assist in communications between a BS 14 and MSs 16. The receive circuitry 138 receives radio frequency signals bearing information from one or more BSs 14 and MSs 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
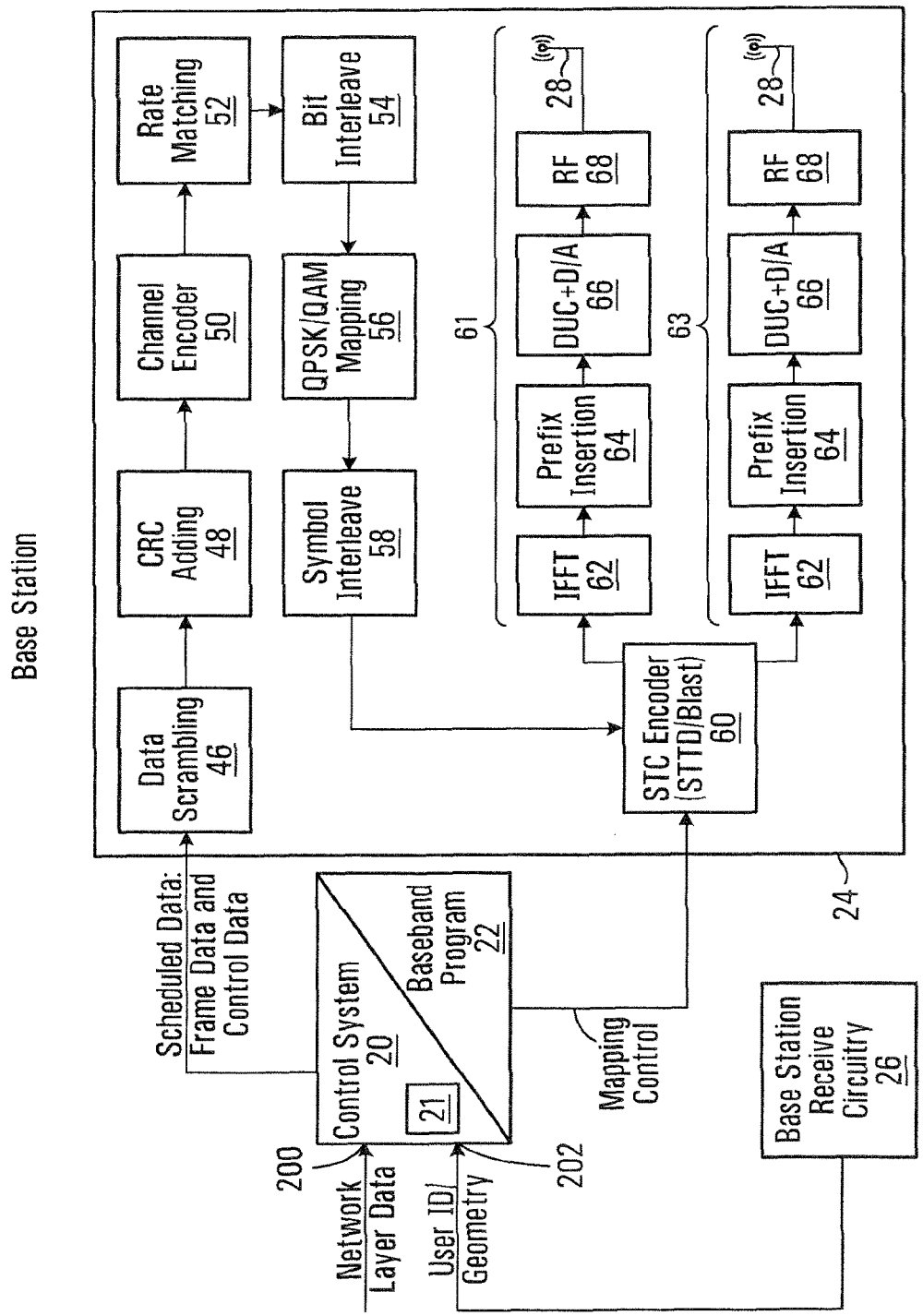
FIG. 5 is a block diagram of a logical breakdown of an example OFDM transmitter architecture that might be used to implement some embodiments of the present application.

With reference to FIG. 5, a logical OFDM transmission architecture will be described. Initially, the BSC 10 will send data to be transmitted to various MSs 16 to the BS 14, either directly or with the assistance of a RS 15. The BS 14 may use the channel quality indicators (CQIs) associated with the mobile terminals to schedule the data for transmission as well as select appropriate coding and modulation for transmitting the scheduled data. The CQIs may be directly from the MSs 16 or determined at the BS 14 based on information provided by the MSs 16. In either case, the CQI for each MS 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the MS 16. Again, the channel coding for a particular MS 16 is based on the CQI. In some implementations, the channel encoder logic 50 uses known turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Quadrature Amplitude Modulation (QAM) or Quadrature Phase Shift Key (QPSK) modulation can be used, by way of example. The degree of modulation can be chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a MS 16. The STC encoder logic 60 will process the incoming symbols and provide "n" outputs corresponding to the number of transmit antennas 28 for the BS 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the MS 16.

For the present example, assume the BS 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. In an example, the IFFT processors 62 operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUG) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended MS 16 are scattered among the sub-carriers. The MS 16, which is discussed in detail below, can use the pilot signals for channel estimation.

Figure 6:
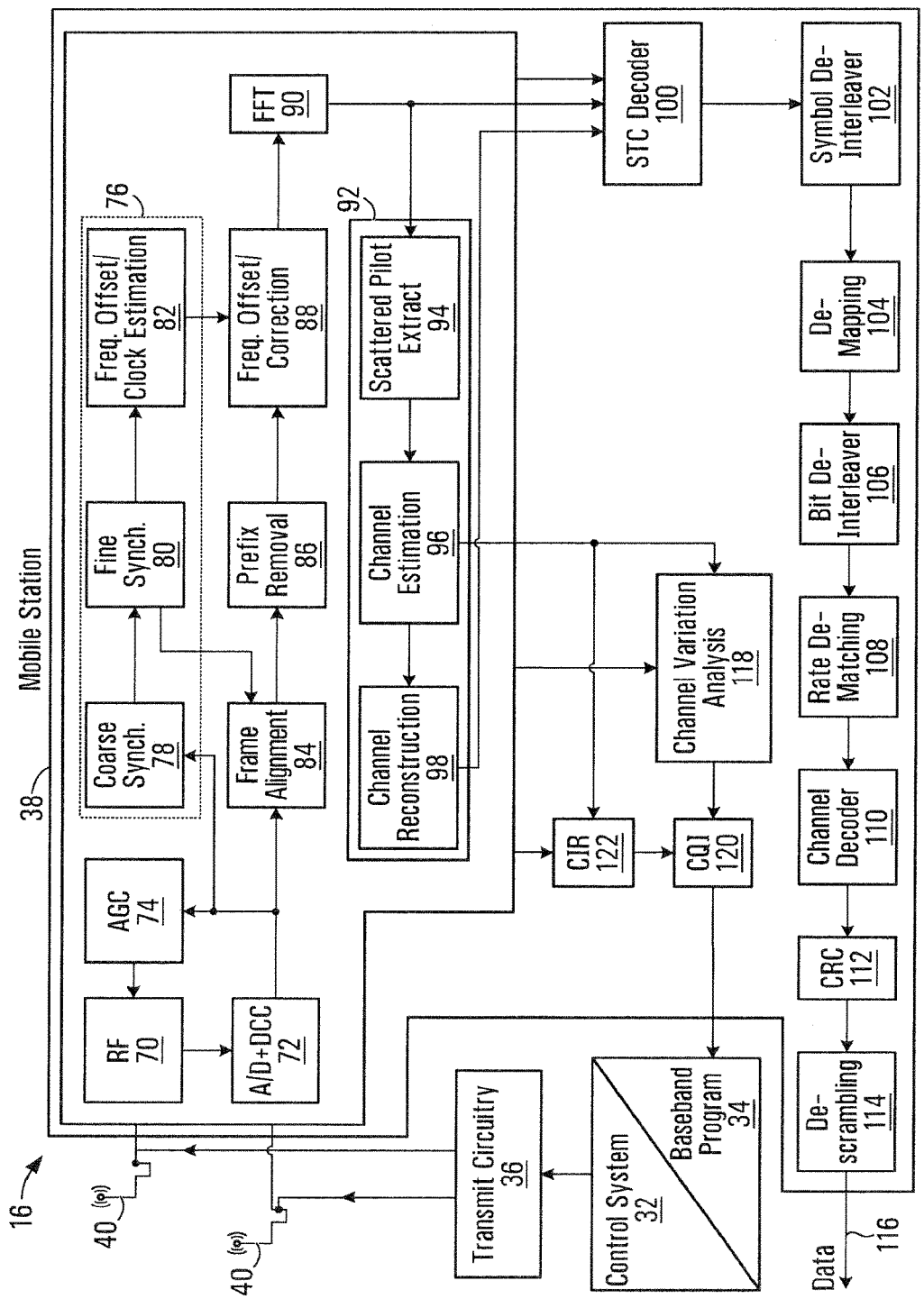
FIG. 6 is a block diagram of a logical breakdown of an example OFDM receiver architecture that might be used to implement some embodiments of the present application.

Reference is now made to FIG. 6 to illustrate reception of the transmitted signals by a MS 16, either directly from BS 14 or with the assistance of RS 15. Upon arrival of the transmitted signals at each of the antennas 40 of the MS 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. The synchronization logic 76 can include frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for descrambling using the known base station de-scrambling code to recover the originally transmitted data 116.

In parallel to recovering the data 116, a CQI, or at least information sufficient to create a CQI at the BS 14, is determined and transmitted to the BS 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

Figure 7:
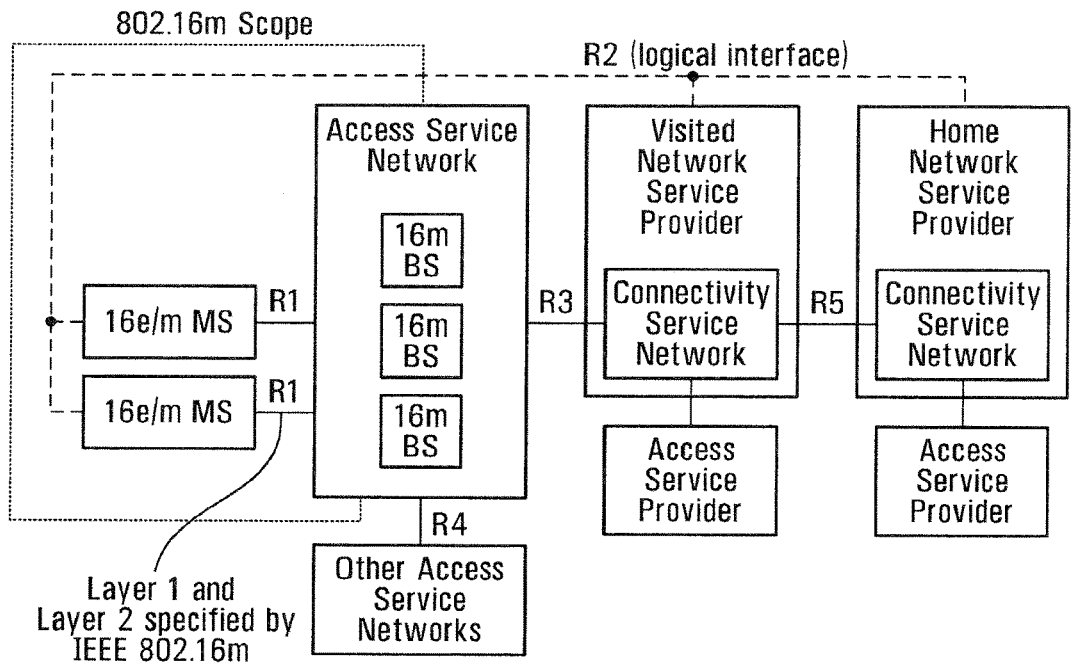
FIG. 7 is FIG. 1 of IEEE 802.16m-08/003r1, an Example of overall network architecture.

Turning now to FIG. 7, there is shown an example network reference model, which is a logical representation of a network that supports wireless communications among the aforementioned BSs 14, MSs 16 and RSs 15, in accordance with a non-limiting embodiment of the present invention. The network reference model identifies functional entities and reference points over which interoperability is achieved between these functional entities. Specifically, the network reference model can include a MS 16, an Access Service Network (ASN), and a Connectivity Service Network (CSN).

The ASN can be defined as a complete set of network functions needed to provide radio access to a subscriber (e.g., an IEEE 802.16e or an IEEE 802.16m subscriber). The ASN can comprise network elements such as one or more BSs 14, and one or more ASN gateways. An ASN may be shared by more than one CSN. The ASN can provide the following functions:

Layer-1 and Layer-2 connectivity with the MS 16;
Transfer of AAA messages to subscriber's Home Network Service Provider (H-NSP) for authentication, authorization and session accounting for subscriber sessions
Network discovery and selection of the subscriber's preferred NSP;
Relay functionality for establishing Layer-3 (L3) connectivity with the MS 16 (e.g., IP address allocation);
Radio resource management.

In addition to the above functions, for a portable and mobile environment, an ASN can further support the following functions:

ASN anchored mobility;
CSN anchored mobility;
Paging;
ASN-CSN tunnelling.

For its part, the CSN can be defined as a set of network functions that provide IP connectivity services to the subscriber. A CSN may provide the following functions:

MS IP address and endpoint parameter allocation for user sessions;
AAA proxy or server;
Policy and Admission Control based on user subscription profiles;
ASN-CSN tunnelling support;
Subscriber billing and inter-operator settlement;
Inter-CSN tunnelling for roaming;
Inter-ASN mobility.

The CSN can provide services such as location based services, connectivity for peer-to-peer services, provisioning, authorization and/or connectivity to IP multimedia services. The CSN may further comprise network elements such as routers, AAA proxy/servers, user databases, and interworking gateway MSs. In the context of IEEE 802.16m, the CSN may be deployed as part of a IEEE 802.16m NSP or as part of an incumbent IEEE 802.16e NSP.

Figure 8:
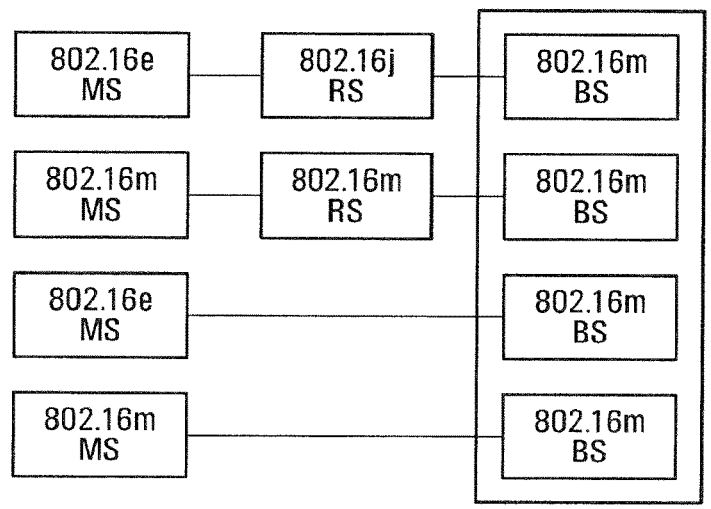
FIG. 8 is FIG. 2 of IEEE 802.16m-08/003r1, a Relay Station in overall network architecture.

In addition, RSs 15 may be deployed to provide improved coverage and/or capacity. With reference to FIG. 8, a BS 14 that is capable of supporting a legacy RS communicates with the legacy RS in the "legacy zone". The BS 14 is not required to provide legacy protocol support in the "16m zone". The relay protocol design could be based on the design of IEEE 802-16j, although it may be different from IEEE 802-16j protocols used in the "legacy zone".

Figure 9:
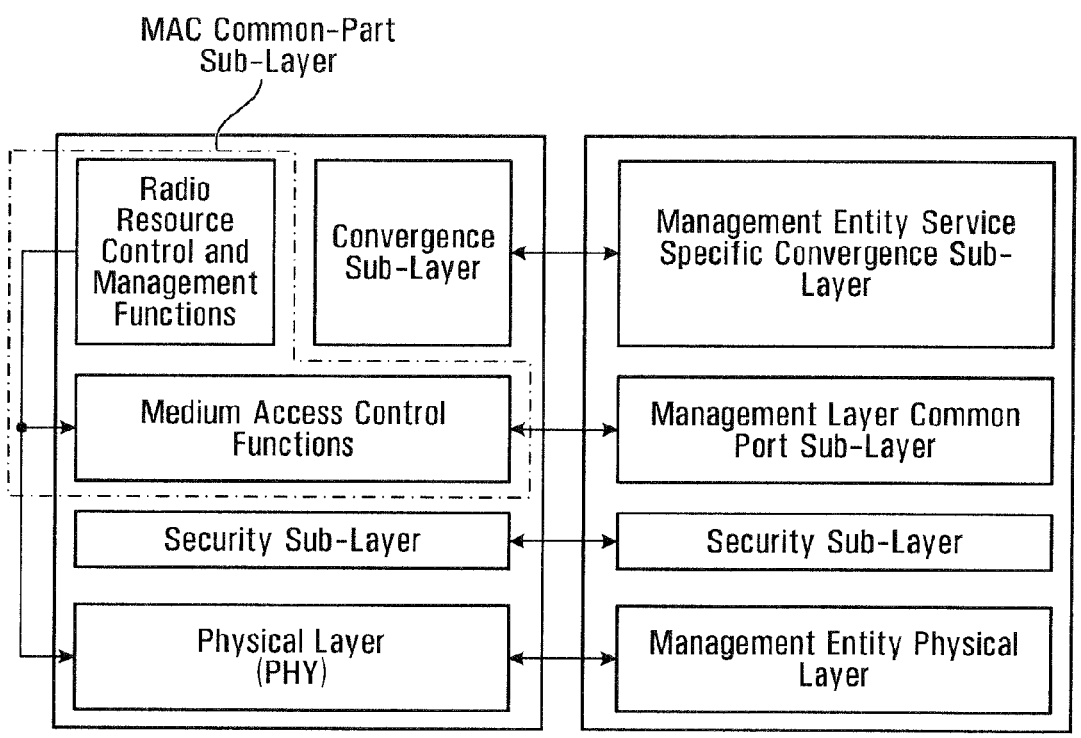
FIG. 9 is FIG. 3 of IEEE 802.16m-08/003r1, a System Reference Model.

With reference now to FIG. 9, there is shown a system reference model, which applies to both the MS 16 and the BS 14 and includes various functional blocks including a Medium Access Control (MAC) common part sublayer, a convergence sublayer, a security sublayer and a physical (PHY) layer.

The convergence sublayer performs mapping of external network data received through the CS SAP into MAC SDUs received by the MAC CPS through the MAC SAP, classification of external network SDUs and associating them to MAC SFID and CID, Payload header suppression/compression (PHS).

The security sublayer performs authentication and secure key exchange and Encryption.

The physical layer performs Physical layer protocol and functions.

The MAC common part sublayer is now described in greater detail. Firstly, it will be appreciated that Medium Access Control (MAC) is connection-oriented. That is to say, for the purposes of mapping to services on the MS 16 and associating varying levels of QoS, data communications are carried out in the context of "connections". In particular, "service flows" may be provisioned when the MS 16 is installed in the system. Shortly after registration of the MS 16, connections are associated with these service flows (one connection per service flow) to provide a reference against which to request bandwidth. Additionally, new connections may be established when a customer's service needs change. A connection defines both the mapping between peer convergence processes that utilize the MAC and a service flow. The service flow defines the QoS parameters for the MAC protocol data units (PDUs) that are exchanged on the connection. Thus, service flows are integral to the bandwidth allocation process. Specifically, the MS 16 requests uplink bandwidth on a per connection basis (implicitly identifying the service flow). Bandwidth can be granted by the BS to a MS as an aggregate of grants in response to per connection requests from the MS.

Figure 10:
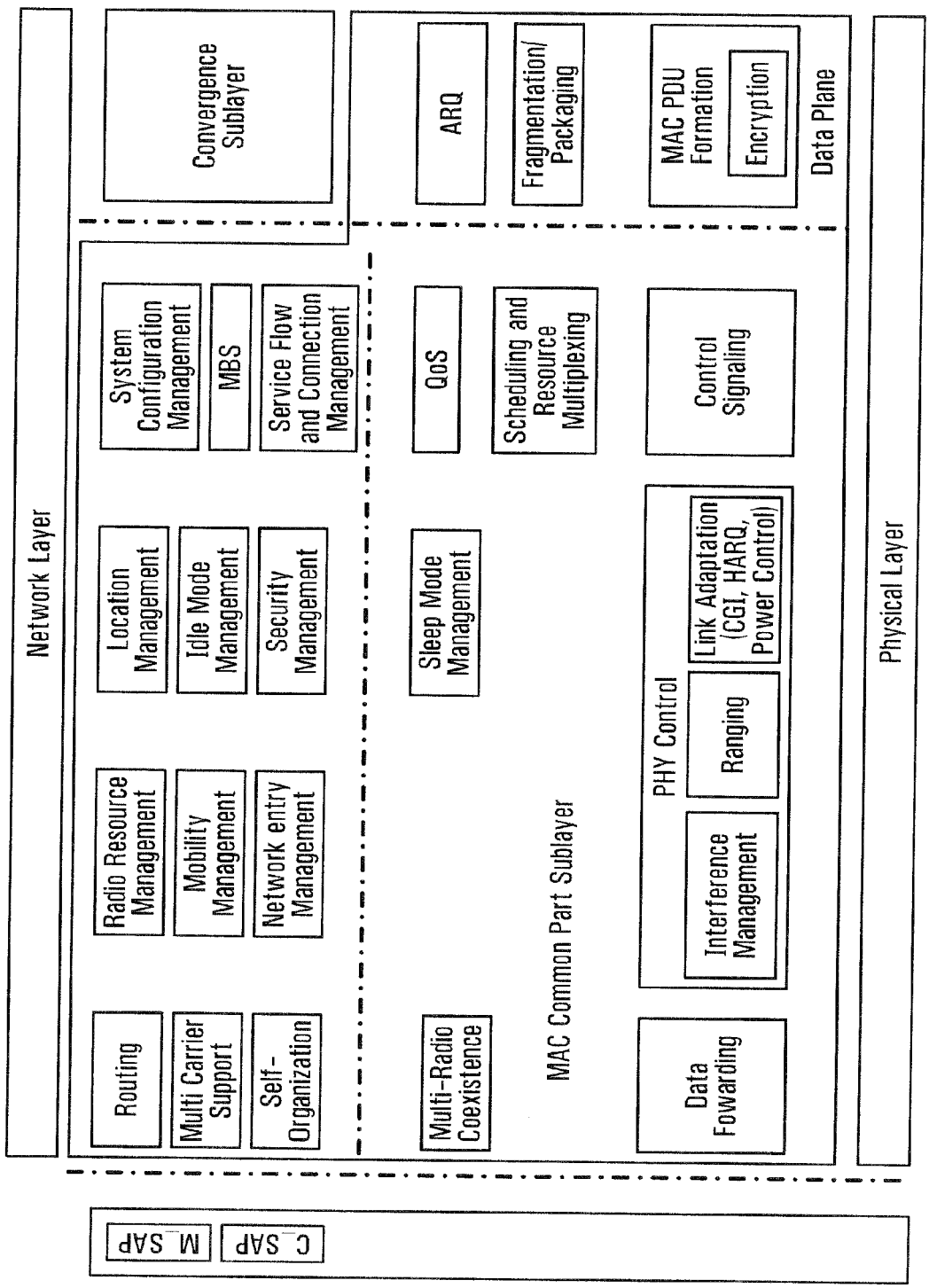
FIG. 10 is FIG. 4 of IEEE 802.16m-08/003r1, The IEEE 802.16m Protocol Structure.

With additional reference to FIG. 10, the MAC common part sublayer (CPS) is classified into radio resource control and management (RRCM) functions and medium access control (MAC) functions.

The RRCM functions include several functional blocks that are related with radio resource functions such as:
Radio Resource Management
Mobility Management
Network Entry Management
Location Management
Idle Mode Management
Security Management
System Configuration Management
MBS (Multicast and Broadcasting Service)
Service Flow and Connection Management
Relay functions
Self Organization
Multi-Carrier Radio Resource Management
  The Radio Resource Management block adjusts radio network parameters based on traffic load, and also includes function of load control (load balancing), admission control and interference control.

Mobility Management
  The Mobility Management block supports functions related to Intra-RAT/Inter-RAT handover. The Mobility Management block handles the Intra-RAT/Inter-RAT Network topology acquisition which includes the advertisement and measurement, manages candidate neighbor target BSs/RSs and also decides whether the MS performs Intra-RAT/Inter-RAT handover operation.

Network Entry Management
  The Network Entry Management block is in charge of initialization and access procedures. The Network Entry Management block may generate management messages which are needed during access procedures, i.e., ranging, basic capability negotiation, registration, and so on.

Location Management
  The Location Management block is in charge of supporting location based service (LBS). The Location Management block may generate messages including the LBS information.

Idle Mode Management
  The Idle Mode Management block manages location update operation during idle mode. The Idle Mode Management block controls idle mode operation, and generates the paging advertisement message based on paging message from paging controller in the core network side.

Security Management
  The Security Management block is in charge of authentication/authorization and key management for secure communication.

System Configuration Management
  The System Configuration Management block manages system configuration parameters, and system parameters and system configuration information for transmission to the MS.

MBS (Multicast and Broadcasting Service)
  The MBS (Multicast Broadcast Service) block controls management messages and data associated with broadcasting and/or multicasting service.

Service Flow and Connection Management
  The Service Flow and Connection Management block allocates "mobile station identifiers" (or station identifiers—STIDs) and "flow identifiers" (FIDs) during access/handover/service flow creation procedures. The mobile station identifiers and FIDs will be discussed further below.

Relay Functions
  The Relay Functions block includes functions to support multi-hop relay mechanisms. The functions include procedures to maintain relay paths between BS and an access RS.
Self Organization
  The Self Organization block performs functions to support self configuration and self optimization mechanisms. The functions include procedures to request RSs/MSs to report measurements for self configuration and self optimization and receive the measurements from the RSs/MSs.
Multi-Carrier
  The Multi-carrier (MC) block enables a common MAC entity to control a PHY spanning over multiple frequency channels. The channels may be of different bandwidths (e.g. 5, 10 and 20 MHz), be on contiguous or non-contiguous frequency bands. The channels may be of the same or different duplexing modes, e.g. Frequency Division Duplexing (FDD), Time Division Duplexing (TDD), or a mix of bidirectional and broadcast only carriers. For contiguous frequency channels, the overlapped guard sub-carriers are aligned in frequency domain in order to be used for data transmission.

The medium access control (MAC) includes function blocks which are related to the physical layer and link controls such as:
  PHY Control
  Control Signaling
  Sleep Mode Management
  QoS
  Scheduling and Resource Multiplexing
  ARQ
  Fragmentation/Packing
  MAC PDU formation
  Multi-Radio Coexistence
  Data forwarding
  Interference Management
  Inter-BS coordination
PHY Control
  The PHY Control block handles PHY signaling such as ranging, measurement/feedback (CQI), and HARQ ACK/NACK. Based on CQI and HARQ ACK/NACK, the PHY Control block estimates channel quality as seen by the MS, and performs link adaptation via adjusting modulation and coding scheme (MCS), and/or power level. In the ranging procedure, PHY control block does uplink synchronization with power adjustment, frequency offset and timing offset estimation.
Control Signaling
  The Control Signaling block generates resource allocation messages. Sleep Mode Management block handles sleep mode operation.
Sleep Mode Management
  The Sleep Mode Management block may also generate MAC signaling related to sleep operation, and may communicate with Scheduling and Resource Multiplexing block in order to operate properly according to sleep period.
QoS
  The QoS block handles QoS management based on QoS parameters input from the Service Flow and Connection Management block for each connection.
Scheduling and Resource Multiplexing
  The Scheduling and Resource Multiplexing block schedules and multiplexes packets based on properties of connections. In order to reflect properties of connections Scheduling and Resource Multiplexing block receives QoS information from The QoS block for each connection.
ARQ
  The ARQ block handles MAC ARQ function. For ARQ-enabled connections, ARQ block logically splits MAC SDU to ARQ blocks, and numbers each logical ARQ block. ARQ block may also generate ARQ management messages such as feedback message (ACK/NACK information).
Fragmentation/Packing
  The Fragmentation/Packing block performs fragmenting or packing MSDUs based on scheduling results from Scheduling and Resource Multiplexing block.
MAC PDU Formation
  The MAC PDU formation block constructs MAC PDU so that BS/MS can transmit user traffic or management messages into PHY channel. MAC PDU formation block adds MAC header and may add sub-headers.
Multi-Radio Coexistence
  The Multi-Radio Coexistence block performs functions to support concurrent operations of IEEE 802.16m and non-IEEE 802.16m radios collocated on the same mobile station.
Data Forwarding
  The Data Forwarding block performs forwarding functions when RSs are present on the path between BS and MS. The Data Forwarding block may cooperate with other blocks such as Scheduling and Resource Multiplexing block and MAC PDU formation block.
Interference Management
  The Interference Management block performs functions to manage the inter-cell/sector interference. The operations may include:
    MAC layer operation
    Interference measurement/assessment report sent via MAC signaling
    Interference mitigation by scheduling and flexible frequency reuse
    PHY layer operation
    Transmit power control
    Interference randomization
    Interference cancellation
    Interference measurement
    Tx beamforming/precoding
Inter-BS Coordination
  The Inter-BS coordination block performs functions to coordinate the actions of multiple BSs by exchanging information, e.g., interference management. The functions include procedures to exchange information for e.g., interference management between the BSs by backbone signaling and by MS MAC messaging. The information may include interference characteristics, e.g. interference measurement results, etc.

Figure 11:
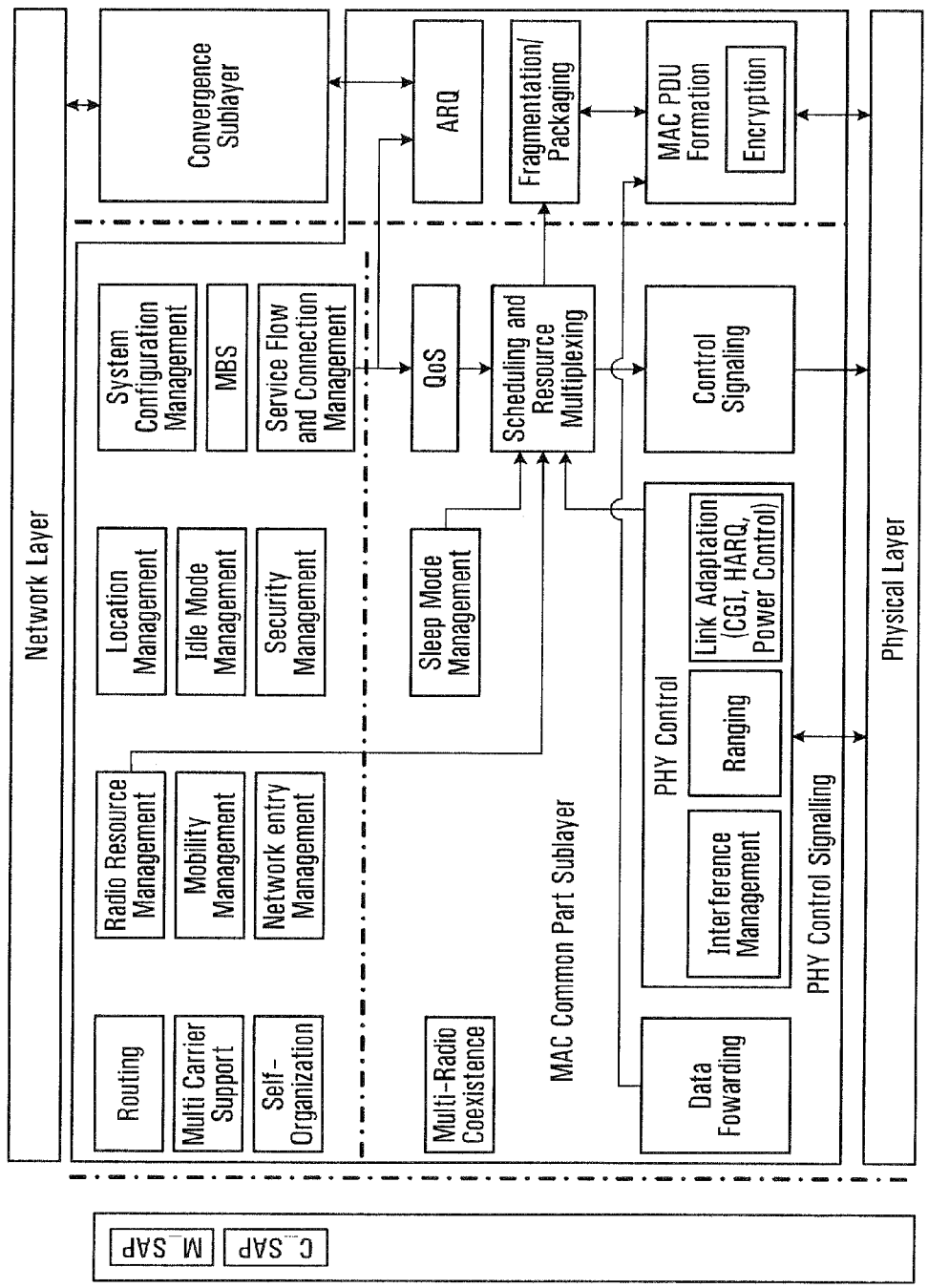
FIG. 11 is FIG. 5 of IEEE 802.16m-08/003r1, The IEEE 802.16m MS/BS Data Plane Processing Flow.

Reference is now made to FIG. 11, which shows the user traffic data flow and processing at the BS 14 and the MS 16. The dashed arrows show the user traffic data flow from the network layer to the physical layer and vice versa. On the transmit side, a network layer packet is processed by the convergence sublayer, the ARQ function (if present), the fragmentation/packing function and the MAC PDU formation function, to form MAC PDU(s) to be sent to the physical layer. On the receive side, a physical layer SDU is processed by MAC PDU formation function, the fragmentation/packing function, the ARQ function (if present) and the convergence sublayer function, to form the network layer packets. The solid arrows show the control primitives among the CPS functions and between the CPS and PHY that are related to the processing of user traffic data.

Figure 12:
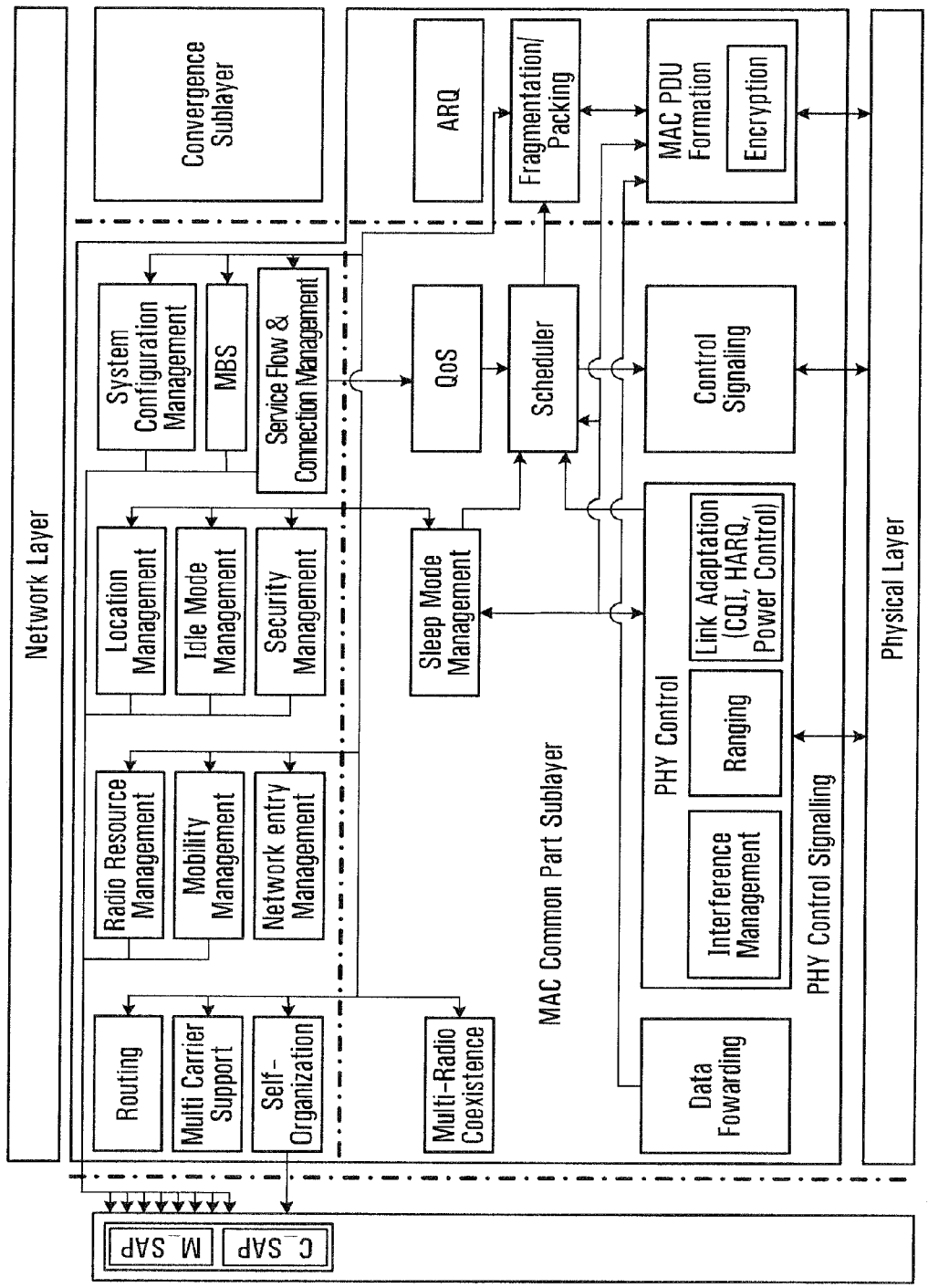
FIG. 12 is FIG. 6 of IEEE 802.16m-08/0030, The IEEE 802.16m MS/BS Control Plane Processing Flow.

Reference is now made to FIG. 12, which shows the CPS control plane signaling flow and processing at the BS 14 and the MS 16. On the transmit side, the dashed arrows show the flow of control plane signaling from the control plane functions to the data plane functions and the processing of the control plane signaling by the data plane functions to form the corresponding MAC signaling (e.g. MAC management messages, MAC header/sub-header) to be transmitted over the air. On the receive side, the dashed arrows show the processing of the received over-the-air MAC signaling by the data plane functions and the reception of the corresponding control plane signaling by the control plane functions. The solid arrows show the control primitives among the CPS functions and between the CPS and PHY that are related to the processing of control plane signaling. The solid arrows between M_SAP/C_SAP and MAC functional blocks show the control and management primitives to/from Network Control and Management System (NCMS). The primitives to/from M_SAP/C_SAP define the network involved functionalities such as inter-BS interference management, inter/intra RAT mobility management, etc, and management related functionalities such as location management, system configuration etc.

Non-limiting examples of MAC management messages include DL-MAP, UL-MAP, DCD and UCD. Although nomenclature from IEEE 802.16 and/or 802.16m has been adopted, it should be appreciated that strict compliance with either standard is not a requirement, and that those skilled in the art will recognize the use of common nomenclature as being an aid in understanding rather than a limitation of the present invention.

The DL-MAP and UL-MAP can be used to define access to the downlink and uplink information respectively. The DL-MAP is a MAC management message that defines burst start times on the downlink. Equivalently, the UL-MAP is a set of information that defines the entire (uplink) access for all MSs during a scheduling interval. Basically, the DL-MAP and UL-MAP can be viewed as directories, broadcasted by the BS, of downlink and uplink frames.

The DCD (Downlink Channel Descriptor) message is a broadcasted MAC management message transmitted by the BS 14 at a periodic time interval in order to provide the burst profiles (physical parameter sets) that can be used by a downlink physical channel during a burst, in addition to other useful downlink parameters. The UCD (Uplink Channel Descriptor) message is a broadcasted MAC management message transmitted by the BS at a periodic time interval in order to provide the burst profile (physical parameter sets) description that can be used by an uplink physical channel in addition to other useful uplink parameters.

Figure 13:
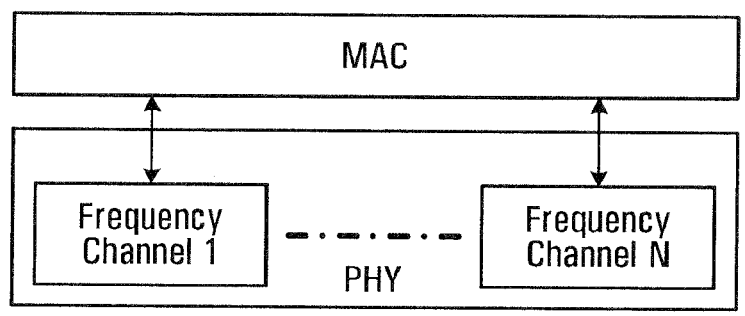
FIG. 13 is FIG. 7 of IEEE 802.16m-08/003r1, Generic protocol architecture to support multicarrier system.

Reference is now made to FIG. 13, which shows a generic protocol architecture to support a multicarrier system. A common MAC entity may control a PHY spanning over multiple frequency channels. Some MAC messages sent on one carrier may also apply to other carriers. The channels may be of different bandwidths (e.g. 5, 10 and 20 MHz), be on contiguous or non-contiguous frequency bands. The channels may be of different duplexing modes, e.g. FDD, TDD, or a mix of bidirectional and broadcast only carriers.

The common MAC entity may support simultaneous presence of MSs 16 with different capabilities, such as operation over one channel at a time only or aggregation across contiguous or non-contiguous channels.

Figure 20:
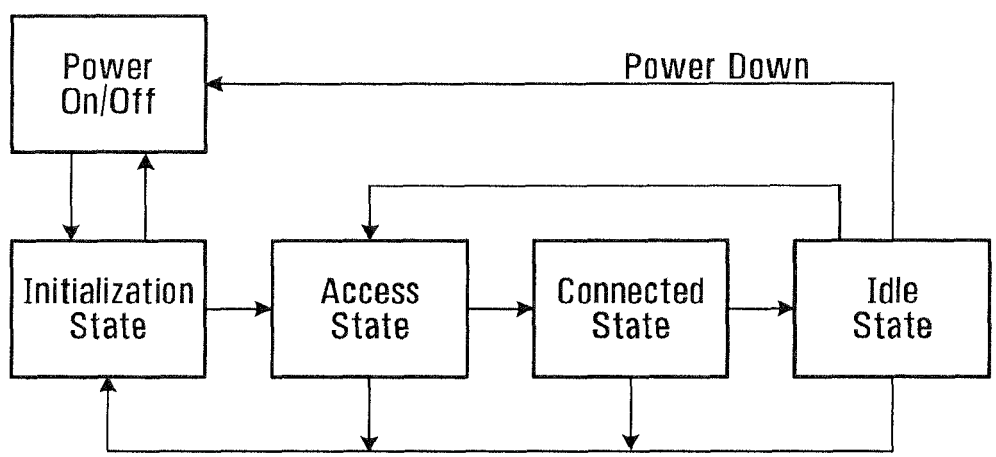
FIG. 20 shows a state diagram of a mobile station, illustrating a number of possible states, including an initialization state, an access state, a connected state and an idle state.

FIG. 20 illustrates a possible state transition diagram for a MS 16. By way of non-limiting example, the diagram shows four (4) states, Initialization state, Access state, Connected state and Idle state.

Figure 21:
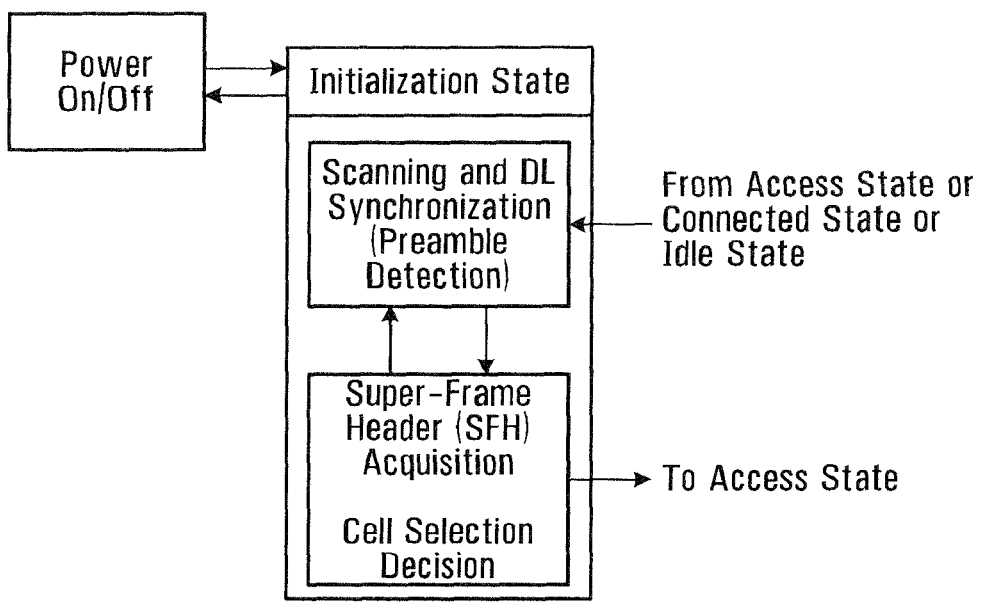
FIG. 21 shows in greater detail how the mobile station transitions into and out of the initialization state.

Initialization State
    In the Initialization state (see FIG. 21), the MS 16 performs cell selection by scanning, synchronizing and acquiring the system configuration information before entering Access state. If the MS 16 cannot properly perform the system configuration information decoding and cell selection, it returns to perform scanning and downlink synchronization. If the MS 16 successfully decodes the information and selects a target BS 14, it transitions to the Access state.

Figure 22:
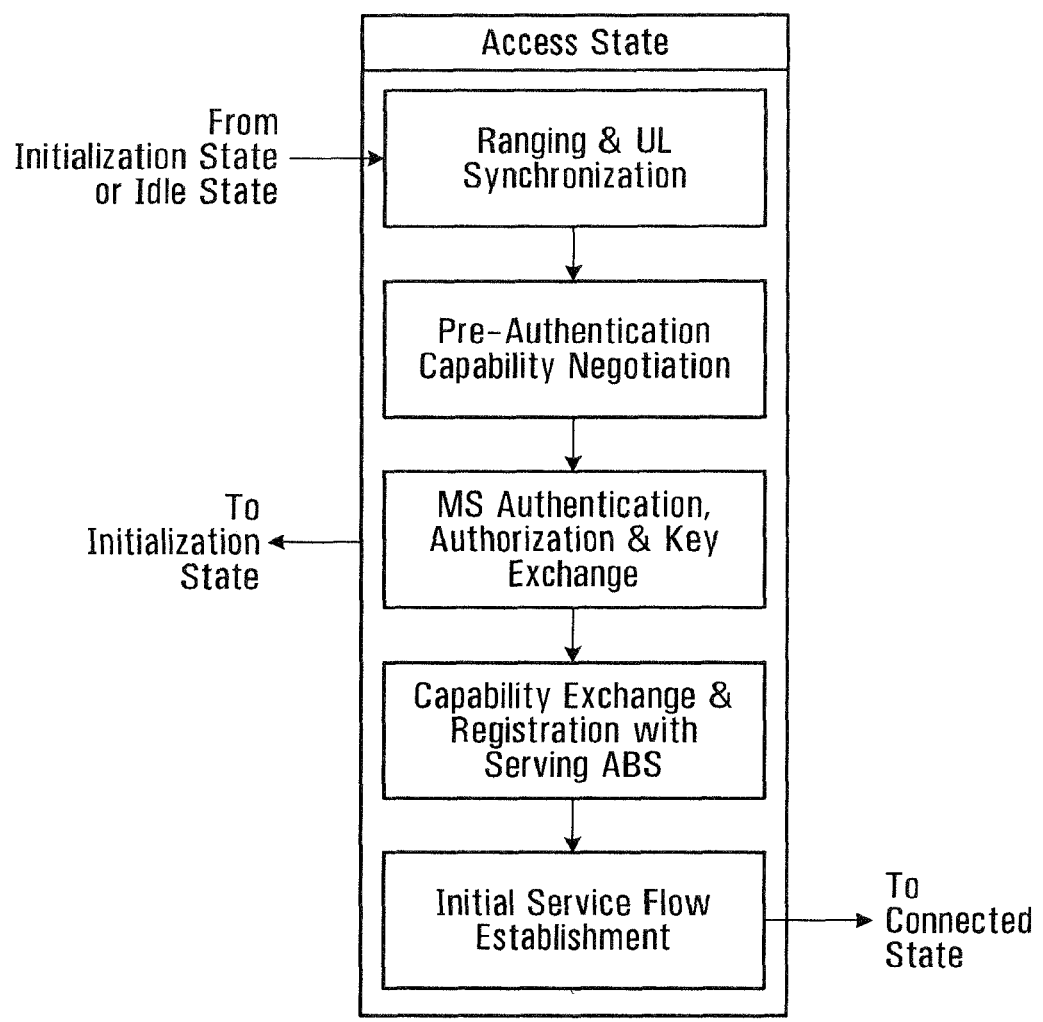
FIG. 22 shows in greater detail how the mobile station transitions into and out of the access state.

Access State
    In the Access state (see FIG. 22), the MS 16 performs network entry with the target BS 14. Network entry is a multi step process consisting of ranging, pre-authentication capability negotiation, authentication and authorization, capability exchange and registration.
    The breakdown of the system entry procedure leading from downlink scanning and synchronization to the point where a connection is established can be as follows, by way of non-limiting example:
        Downlink scanning and synchronization and acquisition of granting message (which grants uplink resource) and acquisition of description of downlink channel and uplink channel;
        Initial ranging
        Capability negotiation
        Authorization and authentication/key exchange
        Registration with BS 14
        Connection establishment
    Upon failure to complete network entry, the MS 16 may transition to the Initialization state.

Figure 23:
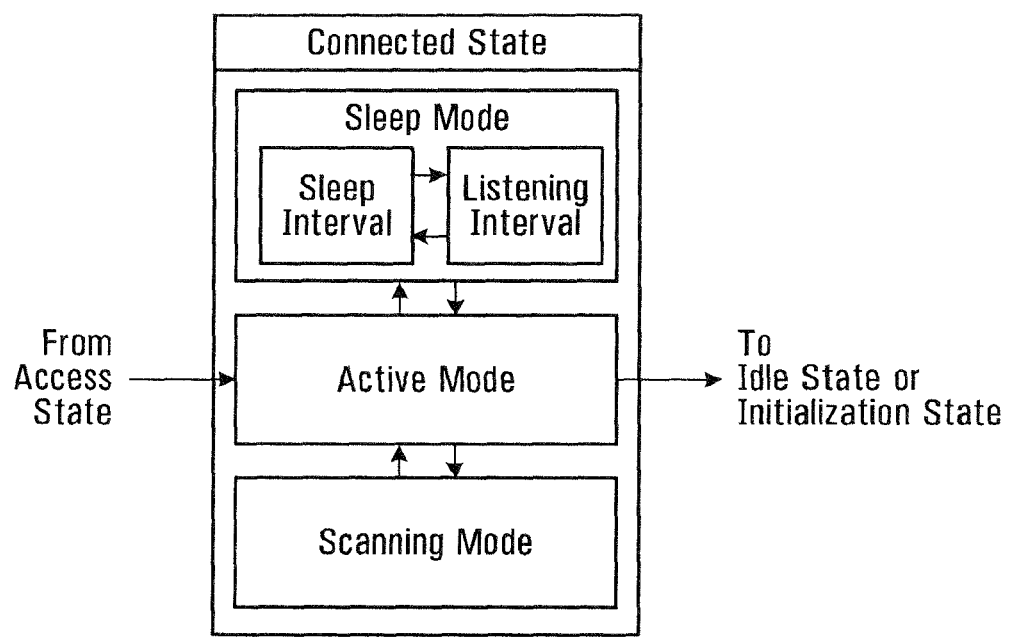
FIG. 23 shows in greater detail how the mobile station transitions into and out of the connected state.

Connected State
    When in the Connected state the MS 16 may operate in one of 3 modes (see FIG. 23): Sleep mode, Active mode and Scanning mode. During the Connected state, the MS 16 can maintain one or more fundamental connections established during Access state. Additionally the MS 16 and BS 14 may establish additional transport connections. The MS 16 may remain in the Connected state during a handover. The MS 16 may transition from the Connected state to the Idle state on a command from the BS 14. Failure to maintain the fundamental connection(s) may also prompt the MS 16 to transition to the Initialization state.
    Referring now to the modes of operation in the Connected state, when the MS 16 is in Active mode, the BS 14 may schedule the MS 16 to transmit and receive at the earliest available opportunity provided by the protocol being implemented, i.e. the MS is assumed to be 'available' to the BS 14. The MS 16 may request a transition to either Sleep or Scanning mode from Active mode. Transition to Sleep or Scanning mode can happen on command from the BS 14. The MS 16 may transition to Idle state from Active mode of the Connected state.
    When in Sleep mode, the MS 16 and BS 14 agree on a division of the resources in time into Sleep Windows and Listening Windows. The MS 16 is only expected to be capable of receiving transmissions from the BS 14 during the Listening Windows and any protocol exchange has to be initiated during that time. The MS 16 transition to Active mode is prompted by control messages received from the BS 14. The MS 16 may transition to Idle state from Sleep mode of the Connected state during Listening Intervals.

When in Scanning mode, the MS 16 performs measurements as instructed by the BS 14. The MS 16 is unavailable to the BS 14 while in scanning mode. The MS 16 returns to Active mode once the duration negotiated with the BS 14 for scanning expires.

Idle State

Figure 24:
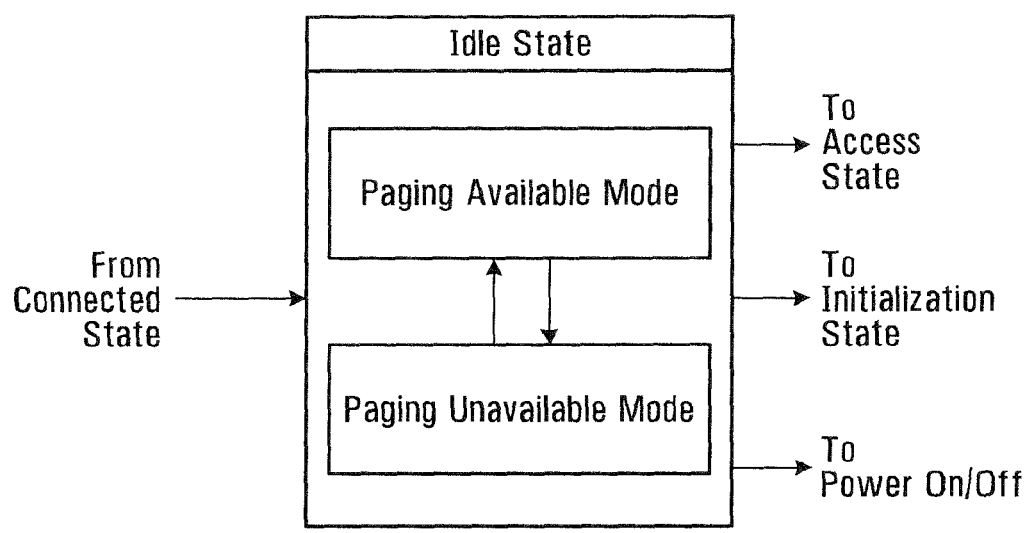
FIG. 24 shows in greater detail how the mobile station transitions into and out of the idle state.

The Idle state (see FIG. 24) may, by way of non-limiting example, include 2 separate modes, namely Paging Available mode and Paging Unavailable mode, based on its operation and MAC message generation. During the Idle state, the MS 16 may perform power saving by switching between Paging Available mode and Paging Unavailable mode.

Idle Mode, the MS 16 may belong to one or multiple paging groups. When in Idle mode, the MS 16 may be assigned paging groups of different sizes and shapes based on user mobility. The MS 16 monitors the paging message at during the MS's Paging Listening Interval. The start of the MS's Paging Listening Interval is derived based on paging cycle and paging offset. Paging offset and paging cycle can be defined in terms of number of superframes.

The MS 16 may thus be paged by the BS 14 (using a specialized paging message) while it is in the Paging Available mode. If the MS 16 is paged with indication to return to the Connected state, the MS 16 transitions to the Access state for its network re-entry.

The MS 16 may also perform a location update procedure during Idle State.

During Paging Unavailable mode, MS 16 does not need to monitor the downlink channel in order to reduce its power consumption.

The MS has a global address (or global identifier) and logical addresses (or logical identifiers) that identify the MS 16 during operation. Specifically, the global address can be a globally unique 48-bit IEEE Extended Unique Identifier (EUI-48™) based on the 24-bit Organizationally Unique Identifier (OUI) value administered by the IEEE Registration Authority. However, this is not a limitation or restriction of the present invention.

As far as the logical identifiers are concerned, these can include one or more "flow identifiers" (FIDs) and one or more "mobile station identifiers". The FIDs can uniquely identify management connections and transport connections that the MS 16 has established with the network. Some specific FIDs may be pre-assigned. For their part, the mobile station identifiers uniquely identify the MS 16 within the domain of the BS 14. Various types of STID could be as follows:

Access ID: a temporary identifier assigned to the MS 16 when performing a ranging operation (i.e., upon network entry while in the Access state or upon network re-entry or during a location update while in the Idle state). This ID can be assigned to the MS 16 by the BS 14 when the BS 14 first detects a ranging code transmission from the MS 16.

MS ID: an identifier assigned to the MS 16 for use in the Connected state. The MS ID replaces the Access ID and can be sent to the MS 16 during the ranging operation. Downlink control information dedicated to a particular MS (e.g. downlink PHY burst/resource allocation) can be addressed using the MS ID. The MS ID may, but need not be, be the same length as the Access ID identifier.

Idle ID: an identifier assigned to an MS for use in the Idle state. In order to reduce signaling overhead and provide location privacy, the Idle ID can be assigned to uniquely identify those MSs in the Idle state that are in a particular paging group. The Idle ID remains valid for the MS 16 as long as the MS 16 stays in the same paging group. The Idle ID may be assigned during Idle state entry or during location update due to a paging group change. The Idle ID can be included in a message sent by the MS 16 in the Idle state for the purposes of page response or location update.

By way of example, the mobile station identifiers mentioned above could be 8 bits, 10 bits or 12 bits in length, although longer or shorter STIDs are possible without departing from the present invention. Different mobile station identifiers can be of different lengths. For example, the Access ID could be the same length and the MS ID, both of which could be shorter than the Idle ID. However, this is only an example and is not to be considered limiting. Other mobile station identifiers may exist and could be reserved, for example, for broadcast or multicast services.

Figure 15:
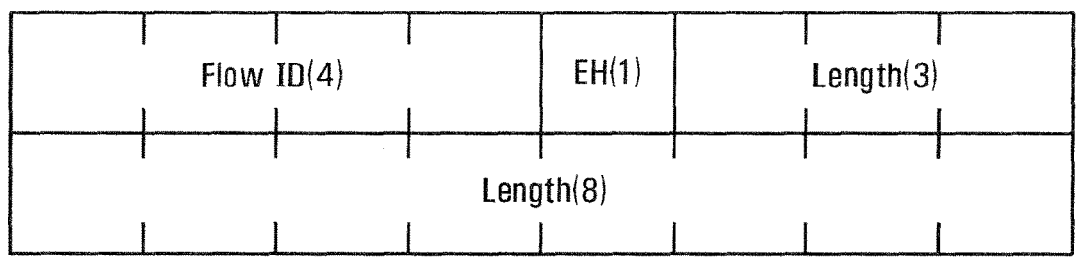
FIG. 15 conceptually illustrates a header of a medium access control protocol data unit (MAC PDU).

As will be appreciated by those of skill in the art, a MAC PDU is a package of data (group of data bits, or datagram) that contain header, connection address and data protocol information that is used to control and transfer information across a type of medium (such as a radio channel). With reference now to FIG. 15, the MAC PDU created in association with a given connection contains a header, which holds the corresponding FID along with control information (e.g., a length field, which indicates the length of the payload of the MAC PDU and an Extended Header (EH) bit which, if set, indicates that additional information appears in an extended portion (not shown) of the header). The MAC PDU may also have payload of data and error checking bits (CRC) bits after the header (e.g. user data). The payload may be used to carry management messages and data associated with various traffic connections.

Being local to the MS, each FID is shorter than the 16-bit CID defined in IEEE Standard 802.16-2004 or IEEE Standard 802.16-2009. In one non-limiting embodiment, the HD can be of length 4 bits. In another non-limiting embodiment, the FID can be of length 3 bits. Other possibilities exist within the scope of the present invention. The use of the FID in the MAC header also results in a shorter overall MAC header than the ones proposed in IEEE 802.16-2004 or IEEE 802.16-2009, where the 16-bit CID is used.

The following now describes a ranging operation that can be performed by the MS 16 and the BS 14 in order to establish connectivity. The ranging operation is performed by the appropriate functional blocks described above and, in particular, the functional blocks belonging to the Medium Access Control (MAC) Common Part Sublayer (CPS). These functional blocks may include, for example and without limitation, the Network Entry Management block and the Idle Mode Management block (part of the radio resource control and management—RRCM—functions), as well as the PHY Control block (part of the medium access control—MAC—functions) described earlier in connection with FIG. 10.

Three non-limiting scenarios of the ranging operation will be described, namely Scenario A in which the MS 16 is seeking to establish initial connectivity to the network (i.e., the MS 16 is powered up, goes through the Initialization state and performs ranging from the Access state), Scenario B in which the MS 16 performs ranging upon re-entering the network (e.g., after having been in the Idle state, after having left the network to use a different one, then returned (i.e., roaming), etc.), and Scenario C in which the MS 16, after having been in the Idle state, performs ranging in the context of a location update.

Scenario A

In Scenario A, the MS 16 is seeking to establish initial connectivity to the network. Firstly, the MS 16 is powered up and goes through the Initialization state. During the Initialization state, the MS 16 performs scanning and synchronization. In other words, when the MS 16 wants to join the network, it first scans the downlink frequencies to search for a suitable channel. The search is complete as soon as it detects a downlink frame. The next step is to establish synchronization with the BS 14. Once the MS 16 receives a DL-MAP message and a DCD message, the downlink synchronization phase is complete and the MS 16 remains synchronized as long as it keeps receiving DL-MAP and DCD messages. After the synchronization is established, the MS 16 waits for a UCD message to acquire uplink channel parameters.

Figure 14:
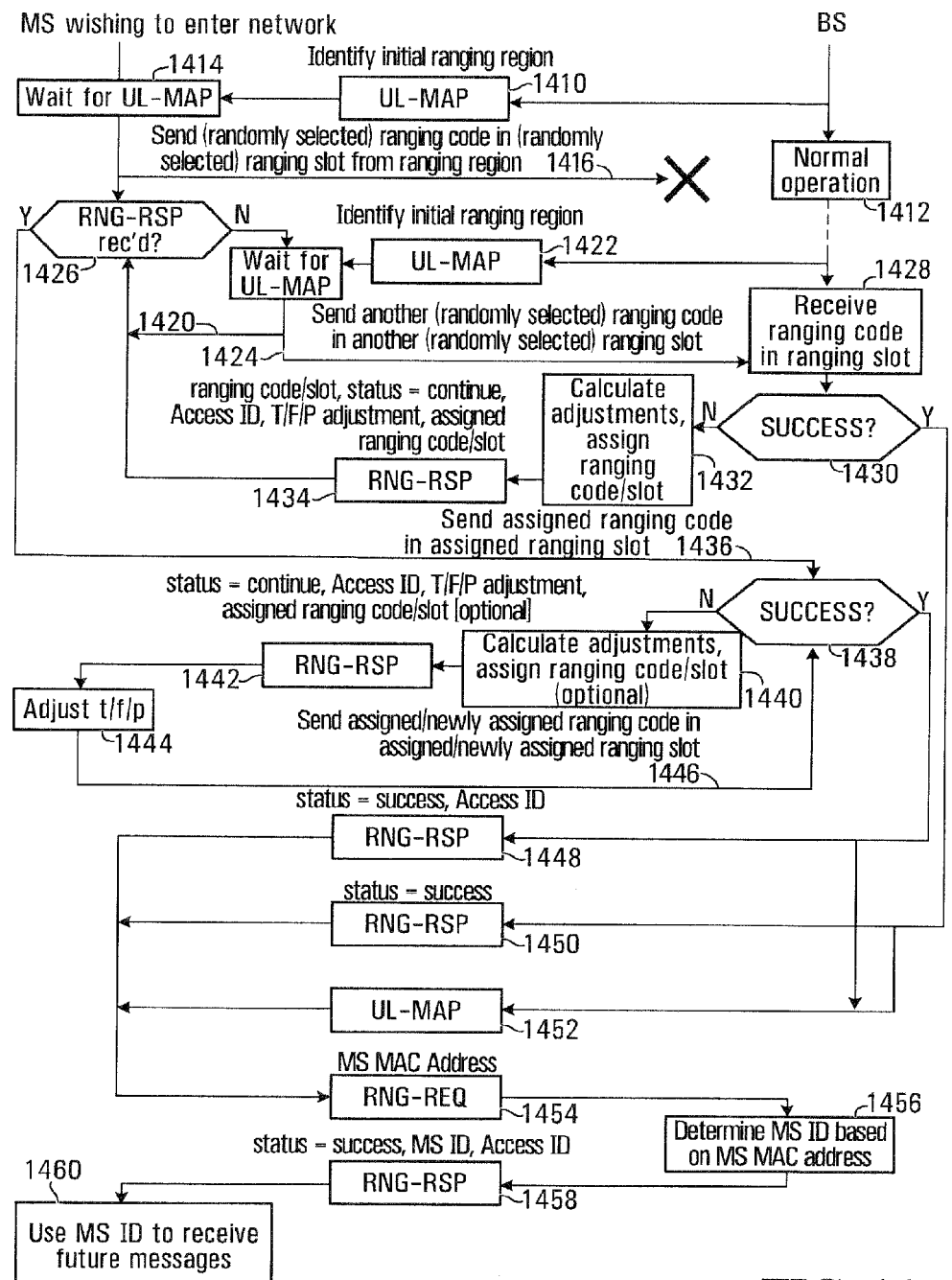
FIG. 14 is a flow diagram showing a message flow between a base station and a mobile station involved in a ranging operation therewith, in the case of initial network entry, in accordance with a specific non-limiting embodiment of the present invention.

A ranging operation now takes place while the MS 16 is in the Access state. With reference to FIG. 14, the BS 14 issues an uplink granting message 1410 (e.g., a UL-MAP message) which defines an initial ranging interval to be used by the MS 16 in the uplink frame. The contents of the uplink granting message could be formulated by an uplink scheduler in the BS 14. The uplink scheduler manages uplink bandwidth, and schedules MSs that will be allocated uplink grants based on the QoS requirements of their service flow(s) and bandwidth requests. An uplink grant allocated by the uplink scheduler is directed towards a reserved FID (e.g., broadcast) and can use a predefined robust profile with BPSK ½ modulation/FEC, for example. After transmission of granting message 1410, the BS 14 continues to operate normally (1412). This includes the periodic issuance of other granting messages, such as granting message 1422.

Meanwhile, as shown at 1412, the MS 16 has been waiting for receipt of a granting message and is assumed to ultimately receive granting message 1410. Upon receipt of the granting message 1410, the MS 16 formulates a ranging message 1416 characterized by a set of ranging resources. For example, the MS 16 can select, at random, a code from a set of pseudonoise ranging codes, modulate it onto a ranging subchannel, and subsequently transmit it in a randomly selected ranging slot from among a set of available ranging slots on the uplink frame. The MS 16 can use random selection or random backoff to select a ranging slot. When random selection is used, the MS 16 can select one ranging slot from all available slots in a single frame using a uniform random process, although other possibilities exist. When random backoff is used, the MS 16 can select one ranging slot from all available ranging slots in a corresponding backoff window using a uniform random process, for example.

If the BS 14 properly detects the presence of the ranging code in the ranging slot of ranging message 1416, then the BS 14 issues a ranging response message to the MS 16. For example, the ranging response message could take a form similar to an RNG-RSP message as defined in IEEE 802.16 or 802.16m. In anticipation of this event, at step 1426, the MS 16 determines whether an RNG-RSP message has been received from the BS 14. If a certain amount of time has elapsed, and a RNG-RSP message has not been received, then this means that the BS 14 has not properly detected the presence of the ranging code in the ranging slot of ranging message 1416. This could be for a variety of reasons, including power issues, interference, etc. Meanwhile, the MS 16 is also attentive to receipt of further granting messages (step 1420). If indeed the aforementioned granting message 1422 is received without having receiving an intervening RNG-RSP message from the BS 14, then the MS 16 will be granted a new ranging interval in an uplink frame.

In response, and similar to what was described earlier, the MS 16 formulates a ranging message 1424 that is characterized by a set of ranging resources. Specifically, the MS 16 selects, at random, a code from a set of pseudonoise ranging codes, modulates it onto a ranging subchannel, and subsequently transmits it in a randomly selected ranging slot from among a set of available ranging slots on the uplink frame, and returns to step 1426. If the BS 14 properly detects the presence of the ranging code in the ranging slot of ranging message 1424, then the BS 14 will issue a ranging response message to the MS 16. In anticipation of this event, at step 1426, the MS 16 determines whether a ranging response message has been received from the BS 14. If a certain amount of time has elapsed, and a ranging response message still has not been received, then the MS 16 will receive yet another granting message at step 1420 and so on. However, if the BS 14 does properly detect the presence of the ranging code in the ranging slot of ranging message 1424 (step 1428), then the BS 14 will determine whether the ranging operation is successful (step 1430). In other words, just because the BS 14 can hear the MS 16 does not mean that the MS 16 is using adequate power, timing and frequency parameters.

Thus, the outcome of step 1430 may be that the BS 14 has determined that the ranging operation was a success, in which case the BS 14 proceeds to issue a ranging response message 1450 indicative of this determination. On the other hand, the outcome of step 1430 may be that the BS 14 has determined that the ranging operation was not a success. In this case, the BS 14 proceeds to step 1432 where a parameter adjustment is calculated. This may affect one or more of the frequency, timing and power that characterize the signaling used by the MS 16. Various algorithms can be used to determine an adjustment of the power, timing and/or frequency characteristics of the uplink signal. Also at step 1432, the BS 14 calculates a new ranging code and/or a new ranging slot to be used by the MS 16. Also at step 1432, the BS 14 determines an Access ID for the MS 16. The Access ID is as yet unknown to the MS 16. The Access ID can be used by the BS 14 as an address, encryption key or scrambling code for content destined for the MS 16 during the ranging operation.

The BS 14 then proceeds to formulate a ranging response message 1434, which is sent to the MS 16. Ranging response message 1434 specifies that ranging is to continue, and provides any necessary adjustments to the timing/frequency/power characteristics of the uplink signal. In addition, ranging response message 1434 specifies the ranging code and/or ranging slot that were used by the MS 16 to transmit ranging message 1424. This allows the MS 16 to recognize that ranging response message 1434 is actually destined for it. In addition, ranging response message 1434 identifies the assigned ranging code and/or assigned ranging slot to be used by the MS 16 next time. In addition, ranging response message 1434 includes the Access ID mentioned above.

Ranging response message 1434 is then received at the MS 16. The MS 16 executes step 1426 and determines that ranging response message 1434 is indeed a ranging response message destined for the MS. In particular, this can be determined based on fact that the ranging code and/or ranging slot that the MS 16 previously used are present in ranging response message 1434. Therefore, the MS 16 takes the "Y" branch out of step 1426. Also, the MS 16 stores the received Access ID in a memory for future use. Also, the MS 16 makes the requisite adjustments to the power/time/frequency characteristics it uses in the uplink direction. The MS 16 then proceeds to formulate another ranging message 1436 characterized by a set of ranging resources (and also the adjusted time/frequency/power) characteristics. This time, the MS 16 uses the assigned ranging code and the assigned ranging slot received from the BS 14 in ranging response message 1434.

The BS 14 receives ranging message 1436 and determines whether the ranging operation is successful (step 1438). The outcome of step 1438 may be that the BS 14 has determined that the ranging operation was a success, in which case the BS 14 proceeds to issue a ranging response message 1448 indicative of this determination. However, it is possible at this stage that the previous power/time/frequency adjustments were not sufficient. The outcome of step 1438 may therefore be that the BS 14 has determined that the ranging operation was not a success. In this case, the BS 14 proceeds to step 1440 where a further parameter adjustment is calculated. This may again affect one or more of the frequency, timing and power that characterize the signaling used by the MS 16. Various algorithms can be used to determine an adjustment of the power, timing and/or frequency characteristics of the uplink signal. Also at step 1440, the BS 14 may, but need not, calculate a new ranging code and/or a new ranging slot to be used by the MS 16.

The BS 14 then proceeds to formulate a ranging response message 1442, which is sent to the MS 16. Ranging response message 1442 specifies that ranging is to continue, as well as provides any necessary further adjustments to the timing/frequency/power characteristics of the uplink signal. In addition, ranging response message 1442 specifies the Access ID that had previously been sent to the MS 16 in ranging response message 1434. The Access ID allows the MS 16 to recognize that ranging response message 1442 is destined for it. It is therefore not necessary to transmit in ranging response message 1442 the ranging code and/or ranging slot that were used by the MS 16 to transmit ranging message 1436. In addition, ranging response message 1442 identifies the assigned ranging code and/or assigned ranging slot, if computed at step 1440, to be used by the MS 16 in the future.

At step 1444, the MS 16 makes the requisite adjustments to the power/time/frequency characteristics it uses in the uplink direction. The MS 16 then proceeds to formulate another ranging message 1446 characterized by a set of ranging resources (and also the adjusted time/frequency/power) characteristics. The MS 16 uses either the ranging code and the ranging slot it had used in the past or it uses the assigned ranging code and/or the assigned ranging slot specified by the MS 16 in ranging response message 1442. The BS 14 receives ranging message 1446 from the MS 16 and determines whether the ranging operation is successful (step 1438). If the outcome of step 1438 is that the BS 14 has determined that the ranging operation was not a success, then the BS 14 returns to step 1440. However, at some point, the ranging operation will be considered to have been successful, and the BS 14 proceeds to issue a ranging response message 1448 indicative of this determination. Ranging response message 1448 also includes the Access ID identifying the MS 16. However, a lengthy MAC address is not required.

The BS 14 then issues a granting message 1452, which schedules the next uplink transmission from the MS 16. In this case, the next uplink transmission from the MS 16 is a ranging request message 1454 containing the global address (e.g., the 48-bit MAC address) of the MS 16. For example, the ranging request message 1454 could take a form similar to an RNG-REQ message as defined in IEEE 802.16 or 802.16m. Receipt of the global address by the BS 14 allows the BS 14 to determine the true identity of the MS 16 with which the ranging operation has completed successfully. Thus, at step 1456, the BS 14 determines the MS ID based on the global address.

This can be done by looking up the MS ID in a table in a memory, based on the global address. Alternatively, the MS ID can be assigned from a pool of addresses or identifiers, and stored in association with the global address.

The BS 14 then sends a ranging response message 1458 to the MS 16, containing the MS ID, as well as the Access ID identifying the MS. The MS 16 receives the ranging response message 1458, and determines that it is the recipient of this message (based on the Access ID). The MS 16 proceeds to extract the MS ID and store it in a memory. With the ranging operation now complete, the MS 16 enters the Connected state. The MS 16 uses the MS ID in future communication with the network during the Connected state. Future communication can include transmission and/or reception of data in association with management connections and traffic connections.

It should be appreciated that because the Access ID is designed for use specifically during the ranging operation, and because only a limited number of mobile stations will perform ranging at any given time, the Access ID can be limited to a small number of bits and, in particular, fewer than 16 bits. As an example, the 8-10 bit range may be suitable as a length of the Access ID. Also, the fact that the same Access ID could conceivably be recycled by different mobile stations performing ranging at different non-overlapping times, the Access ID does not have a one-to-one mapping to a given MS's global address. This preserves anonymity and enhances security.

Also, because during the Connected state the MS 16 can be identified by the MS ID rather than its global address, and because the MS ID is local to the domain of the serving BS, a similarly small number of bits can be used and, in particular, fewer than 16 bits. Again, the 8-10 bit range may be suitable, by way of example. However, this does not imply that the Access ID and the MS ID need to be of the same length.

It will also be appreciated that the comparatively short length of the Access ID and MS ID cause shortening of the granting message (e.g., UL-MAP), the ranging response message (e.g., RNG-RSP) and the ranging request message (e.g., RNG-REQ). The DL-MAP, DCD and UCD messages would similarly benefit from a reduced length.

A first alternative embodiment is now described with reference to the flow diagram in FIG. 16. Specifically, consider that the outcome of step 1438 is that the BS 14 has determined that the ranging operation was not a success. In this case, the BS 14 proceeds to step 1640 where a further parameter adjustment is calculated. This may again affect one or more of the frequency, timing and power that characterize the signaling used by the MS 16. Various algorithms can be used to determine an adjustment of the power, timing and/or frequency characteristics of the uplink signal. Also at step 1640, the BS 14 calculates a new ranging code and a new ranging slot to be used by the MS 16. As ranging continues, the ranging resources assigned correspond to ranging channels with progressively smaller timing offsets. For example, initial ranging attempts may be sent in a ranging region that spans 6 symbols which is intended to accommodate larger ranging timing offsets. As ranging progresses, the BS 14 can assign ranging resources to the MS 16 that span progressively shorter durations, such as 3 and then 2 symbols. The final ranging resource assigned may only accommodate synchronization to within an OFDM cyclic prefix length. (The final ranging resource assigned may also be retained by the MS 16 for periodic ranging.)

The BS 14 then proceeds to formulate a ranging response message 1642, which is sent to the MS 16. Ranging response message 1642 specifies that ranging is to continue, as well as provides any necessary further adjustments to the timing/frequency/power characteristics of the uplink signal. In addition, ranging response message 1642 identifies the assigned ranging code and the assigned ranging slot to be used by the MS 16 in the future. Indeed, at step 1444, the MS 16 makes the requisite adjustments to the power/time/frequency characteristics it uses in the uplink direction. The MS 16 then proceeds to formulate another ranging message 1646 characterized by a set of ranging resources (and also the adjusted time/frequency/power) characteristics. The MS 16 uses the assigned ranging code and the assigned ranging slot specified by the MS 16 in ranging response message 1642.

A second alternative embodiment is now described with reference to the flow diagram in FIG. 17. Specifically, in this alternative embodiment, once the ranging code and ranging slot used in a ranging message are received ("heard") b the BS 14, the MS 16 continues to use the same ranging code and ranging slot until the BS 14 generates a ranging response message indicative of successful ranging.

Alternatively or in addition, the MS 16 and BS 14 use sequences (or "scrambling codes") for scrambling communications between the two entities. A first such sequence is an "initial ranging sequence" and a second such sequence is a "continued ranging sequence". As shown in FIG. 17, the initial ranging sequence is used by the MS 16 to scramble the ranging messages it sends before it receives the first ranging response message from the BS 14. Also as shown in FIG. 17, the initial ranging sequence is also used by the BS 14 to scramble messages sent to the MS 16 before the MS 16 has received the Access ID. Also as shown in FIG. 17, the continued ranging sequence (or, optionally, the initial ranging sequence) can be used by the MS 16 to scramble the ranging messages it sends between receiving the first ranging response message from the BS 14 and receipt of the MS ID. Thus, it is assumed that the initial ranging sequence (and, if used, the continued ranging sequence) are known to the BS 14 and the MS 16. Also as shown in FIG. 17, after the MS 16 has received the Access ID, the BS 14 scrambles messages destined for the MS 16 using the Access ID. Clearly, the appropriate descrambling needs to be performed by the recipient and therefore prior knowledge of the appropriate scrambling code is needed. For this reason, it is only after the MS 16 has been informed of the Access ID that messages destined for the MS 16 can be scrambled using the Access ID.

Scenario B

In Scenario B, the MS 16 becomes involved in a ranging operation upon re-entering the network (e.g., after having been in the Idle state, after having left the network to use a different one, then returned (i.e., roaming), etc.). Thus, in this scenario, synchronization is assumed to have been maintained. Reference is now made to the flow diagram in FIG. 18, which shows the actions of the BS 14 and MS 16 while the MS 16 is in the Access state. It should be appreciated that ranging can occur autonomously (i.e., MS-initiated) or in response to a paging message 1809 from the BS 14 while the MS 16 is in the Paging Available mode of the Idle state. In the case of a received paging message 1809, the paging message 1809 can specify the set of dedicated ranging resources to be used by the MS 16, such as a dedicated ranging code and a dedicated ranging slot.

The BS 14 issues an uplink granting message 1810 (e.g., a UL-MAP message) which defines an initial ranging interval to be used by the MS 16 in the uplink frame. The contents of the uplink granting message could be formulated by an uplink scheduler in the BS 14. The uplink scheduler manages uplink bandwidth, and schedules MSs that will be allocated uplink grants based on the QoS requirements of their service flow(s) and bandwidth requests. An uplink grant allocated by the uplink scheduler is directed towards a reserved FID (e.g., broadcast) and can use a predefined robust profile with BPSK ½ modulation/FEC, for example. After transmission of granting message 1810, the BS 14 continues to operate normally (1812). This includes the periodic issuance of other granting messages, such as granting message 1822.

Meanwhile, as shown at 1812, the MS 16 has been waiting for receipt of a granting message and is assumed to ultimately receive granting message 1810. Upon receipt of the granting message 1810, the MS 16 formulates a ranging message 1816 characterized by the set of dedicated ranging resources specified in the paging message 1809. This includes a dedicated ranging code and/or a dedicated ranging slot.

If the BS 14 properly detects the presence of the dedicated ranging code in the dedicated ranging slot of ranging message 1816, then the BS 14 issues a ranging response message to the MS 16. For example, the ranging response message could take a form similar to an RNG-RSP message as defined in IEEE 802.16 or 802.16m. In anticipation of this event, at step 1826, the MS 16 determines whether an RNG-RSP message has been received from the BS 14. If a certain amount of time has elapsed, and a RNG-RSP message has not been received, then this means that the BS 14 has not properly detected the presence of the dedicated ranging code in the dedicated ranging slot of ranging message 1816. This could be for a variety of reasons, including power issues, interference, etc. Meanwhile, the MS 16 is also attentive to receipt of further granting messages (step 1820). If indeed the aforementioned granting message 1822 is received without having receiving an intervening RNG-RSP message from the BS 14, then the MS 16 will be granted a new ranging interval in an uplink frame.

In response, and similar to what was described earlier, the MS 16 formulates a ranging message 1824 that is characterized by the same set of dedicated ranging resources. If the BS 14 properly detects the presence of the dedicated ranging code in the dedicated ranging slot of ranging message 1824, then the BS 14 will issue a ranging response message to the MS 16. In anticipation of this event, at step 1826, the MS 16 determines whether a ranging response message has been received from the BS 14. If a certain amount of time has elapsed, and a ranging response message still has not been received, then the MS 16 will receive yet another granting message at step 1820 and so on. However, if the BS 14 does properly detect the presence of the dedicated ranging code in the dedicated ranging slot of ranging message 1824 (step 1828), then the BS 14 will determine whether the ranging operation is successful (step 1830). In other words, just because the BS 14 can hear the MS 16 does not mean that the MS 16 is using adequate power, timing and frequency parameters.

Thus, the outcome of step 1830 may be that the BS 14 has determined that the ranging operation was a success, in which case the BS 14 proceeds to issue a ranging response message 1850 indicative of this determination. On the other hand, the outcome of step 1830 may be that the BS 14 has determined that the ranging operation was not a success. In this case, the BS 14 proceeds to step 1832 where a parameter adjustment is calculated. This may affect one or more of the frequency, timing and power that characterize the signaling used by the MS 16. Various algorithms can be used to determine an adjustment of the power, timing and/or frequency characteristics of the uplink signal. Also at step 1832, the BS 14 optionally calculates a new ranging code and/or a new ranging slot to be used by the MS 16. Also at step 1832, the MS 16 determines an Access ID for the MS 16. The Access ID is as yet unknown to the MS 16.

The Access ID can be used by the BS 14 as an address, encryption key or scrambling code for content destined for the MS 16 during the ranging operation. The BS 14 then proceeds to formulate a ranging response message 1834, which is sent to the MS 16. Ranging response message 1434 specifies that ranging is to continue, and provides any necessary adjustments to the timing/frequency/power characteristics of the uplink signal. In addition, ranging response message 1834 specifies the ranging code and/or ranging slot that were used by the MS 16 to transmit ranging message 1824. This allows the MS 16 to recognize that ranging response message 1834 is actually destined for it. In addition, ranging response message 1834 optionally identifies the new ranging code and/or new ranging slot determined at step 1832. In addition, ranging response message 1834 includes the Access ID mentioned above.

The BS 14 then proceeds to formulate a ranging response message 1834, which is sent to the MS 16. Ranging response message 1434 specifies that ranging is to continue, and provides any necessary adjustments to the timing/frequency/power characteristics of the uplink signal. In addition, ranging response message 1834 specifies the ranging code and/or ranging slot that were used by the MS 16 to transmit ranging message 1824. This allows the MS 16 to recognize that ranging response message 1834 is actually destined for it. In addition, ranging response message 1834 optionally identifies the new ranging code and/or new ranging slot determined at step 1832. In addition, ranging response message 1834 includes the Access ID mentioned above.

Ranging response message 1834 is then received at the MS 16. The MS 16 executes step 1826 and determines that ranging response message 1834 is indeed a ranging response message destined for the MS. In particular, this can be determined based on fact that the ranging code and/or ranging slot that the MS 16 previously used are present in ranging response message 1834. Therefore, the MS 16 takes the "Y" branch out of step 1826. Also, the MS 16 stores the received Access ID in a memory for future use. Also, the MS 16 makes the requisite adjustments to the power/time/frequency characteristics it uses in the uplink direction. The MS 16 then proceeds to formulate another ranging message 1836 characterized by a set of ranging resources (and also the adjusted time/frequency/power) characteristics. The MS 16 uses the either the dedicated ranging code and the dedicated ranging slot, or the new ranging code and the new ranging slot received from the BS 14 in ranging response message 1834.

The BS 14 receives ranging message 1836 and determines whether the ranging operation is successful (step 1838). The outcome of step 1838 may be that the BS 14 has determined that the ranging operation was a success, in which case the BS 14 proceeds to issue a ranging response message 1848 indicative of this determination. However, it is possible at this stage that the previous power/time/frequency adjustments were not sufficient. The outcome of step 1838 may therefore be that the BS 14 has determined that the ranging operation was not a success. In this case, the BS 14 proceeds to step 1840 where a further parameter adjustment is calculated. This may again affect one or more of the frequency, timing and power that characterize the signaling used by the MS 16. Various algorithms can be used to determine an adjustment of the power, timing and/or frequency characteristics of the uplink signal. Also at step 1840, the BS 14 may, but need not, calculate another new ("newer") ranging code and/or another new ("newer") ranging slot to be used by the MS 16.

The BS 14 then proceeds to formulate a ranging response message 1842, which is sent to the MS 16. Ranging response message 1842 specifies that ranging is to continue, as well as provides any necessary further adjustments to the timing/frequency/power characteristics of the uplink signal. In addition, ranging response message 1842 specifies the Access ID that had previously been sent to the MS 16 in ranging response message 1834. The Access ID allows the MS 16 to recognize that ranging response message 1842 is destined for it. It is therefore not necessary to transmit in ranging response message 1842 the ranging code and/or ranging slot that were used by the MS 16 to transmit ranging message 1836. In addition, ranging response message 1842 identifies the newer ranging code and/or the newer ranging slot, if computed at step 1840, to be used by the MS 16 in the future.

At step 1844, the MS 16 makes the requisite adjustments to the power/time/frequency characteristics it uses in the uplink direction. The MS 16 then proceeds to formulate another ranging message 1846 characterized by a set of ranging resources (and also the adjusted time/frequency/power) characteristics. The MS 16 uses either the dedicated ranging code and the dedicated ranging slot, or the new ranging code and the new ranging code it (may have) used last time, or the newer ranging code and the newer ranging slot specified by the MS 16 in ranging response message 1842. The BS 14 receives ranging message 1846 from the MS 16 and determines whether the ranging operation is successful (step 1838). If the outcome of step 1838 is that the BS 14 has determined that the ranging operation was not a success, then the BS 14 returns to step 1840. However, at some point, the ranging operation will be considered to have been successful, and the BS 14 proceeds to issue a ranging response message 1848 indicative of this determination. Ranging response message 1848 also includes the Access ID identifying the MS 16. However, a lengthy MAC address is not required.

The BS 14 then issues a granting message 1852, which schedules the next uplink transmission from the MS 16. In this case, the next uplink transmission from the MS 16 is a ranging request message 1854 containing the Idle ID of the MS 16. For example, the ranging request message 1854 could take a form similar to an RNG-REQ message as defined in IEEE 802.16 or 802.16m. Receipt of the Idle ID by the BS 14 allows the BS 14 to determine the true identity of the MS 16 with which the ranging operation has completed successfully. This is because the Idle ID is uniquely mapped to the MS 16. At step 1856, the BS 14 determines the Access ID based on the Idle ID. This can be done by looking up the MS ID in a table in a memory, based on the Idle ID, which may or may not involve an intermediate step of determining the global address. Alternatively, the MS ID can be assigned from a pool of addresses or identifiers, and stored in association with the Idle ID.

The BS 14 then sends a ranging response message 1858 to the MS 16, containing the MS ID, as well as the Access ID identifying the MS. The MS 16 receives the ranging response message 1858, and determines that it is the recipient of this message (based on the Access ID). The MS 16 proceeds to extract the MS ID and store it in a memory. With the ranging operation now complete, the MS 16 enters the Connected state. The MS 16 uses the MS ID in future communication with the network during the Connected state. Future communication can include transmission and/or reception of data in association with management connections and traffic connections.

Figure 16:
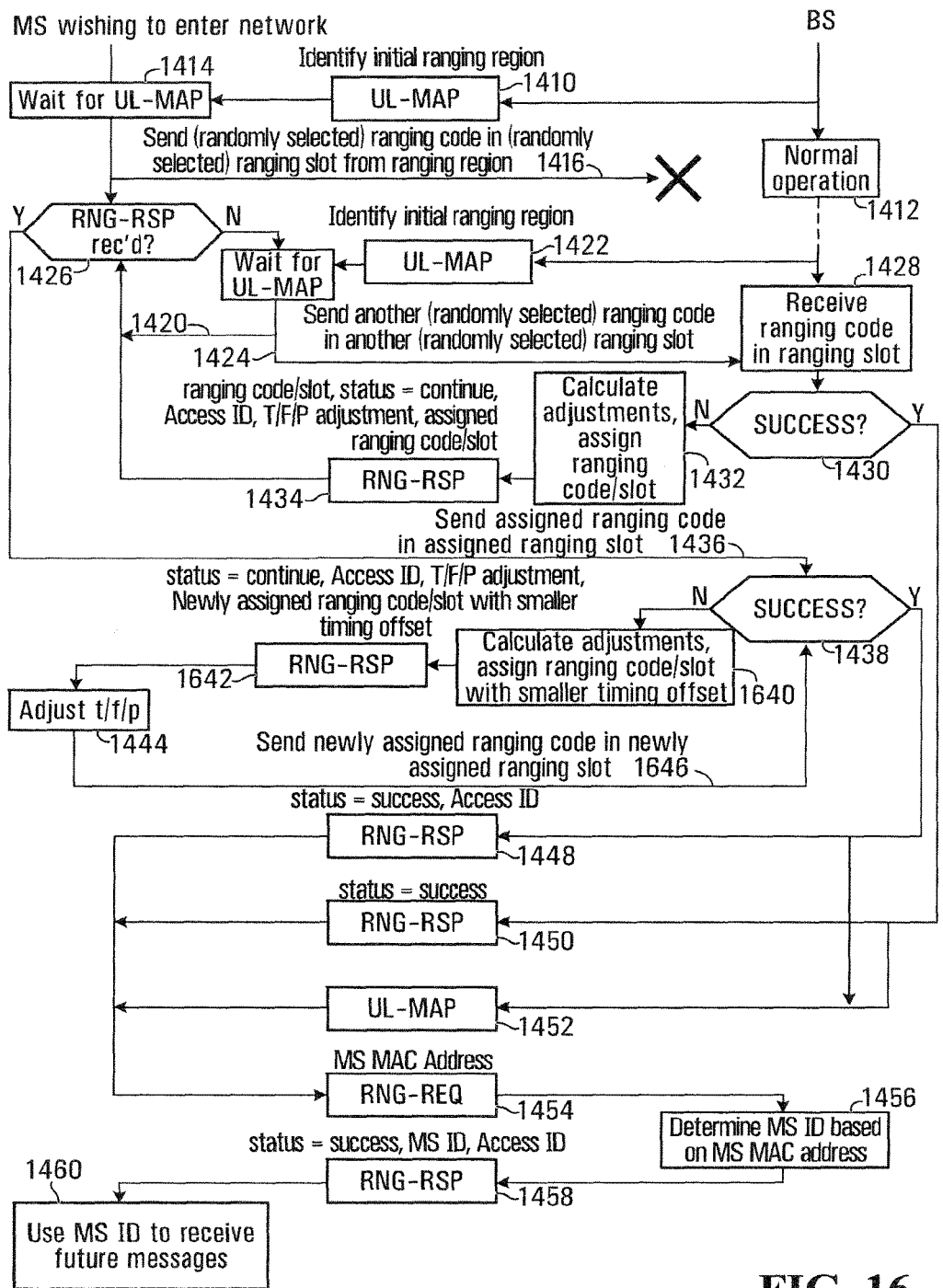
FIG. 16 shows a variant of the flow diagram in FIG. 14.
Figure 18:
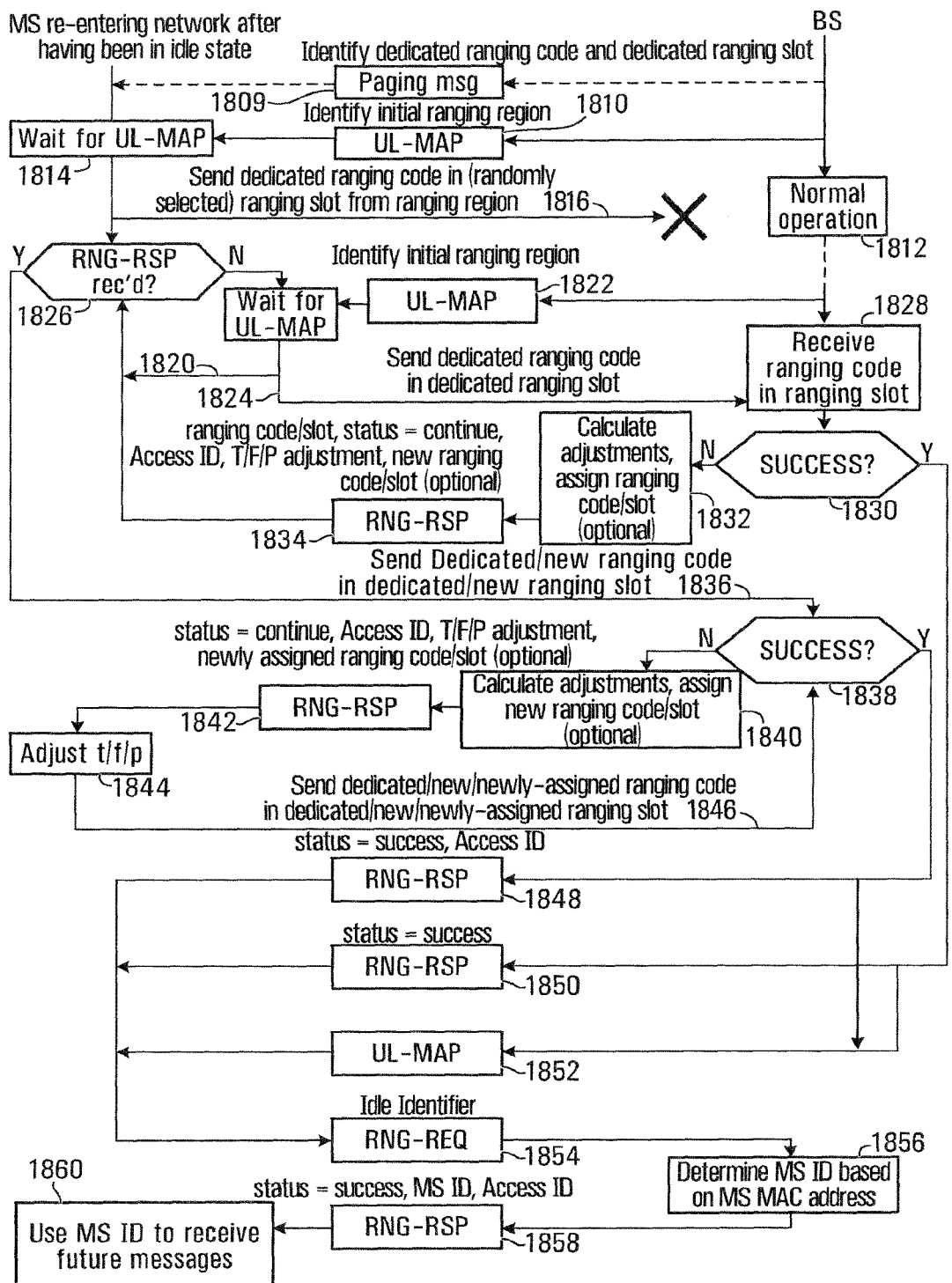
FIG. 18 is a flow diagram showing a message flow between a base station and a mobile station involved in a ranging operation therewith, in the case where the mobile station re-enters the network from an idle state, in accordance with a specific non-limiting embodiment of the present invention.

A first alternative embodiment can incorporate changes to FIG. 18 similar to those that modified the flow diagram in FIG. 16.

Figure 17:
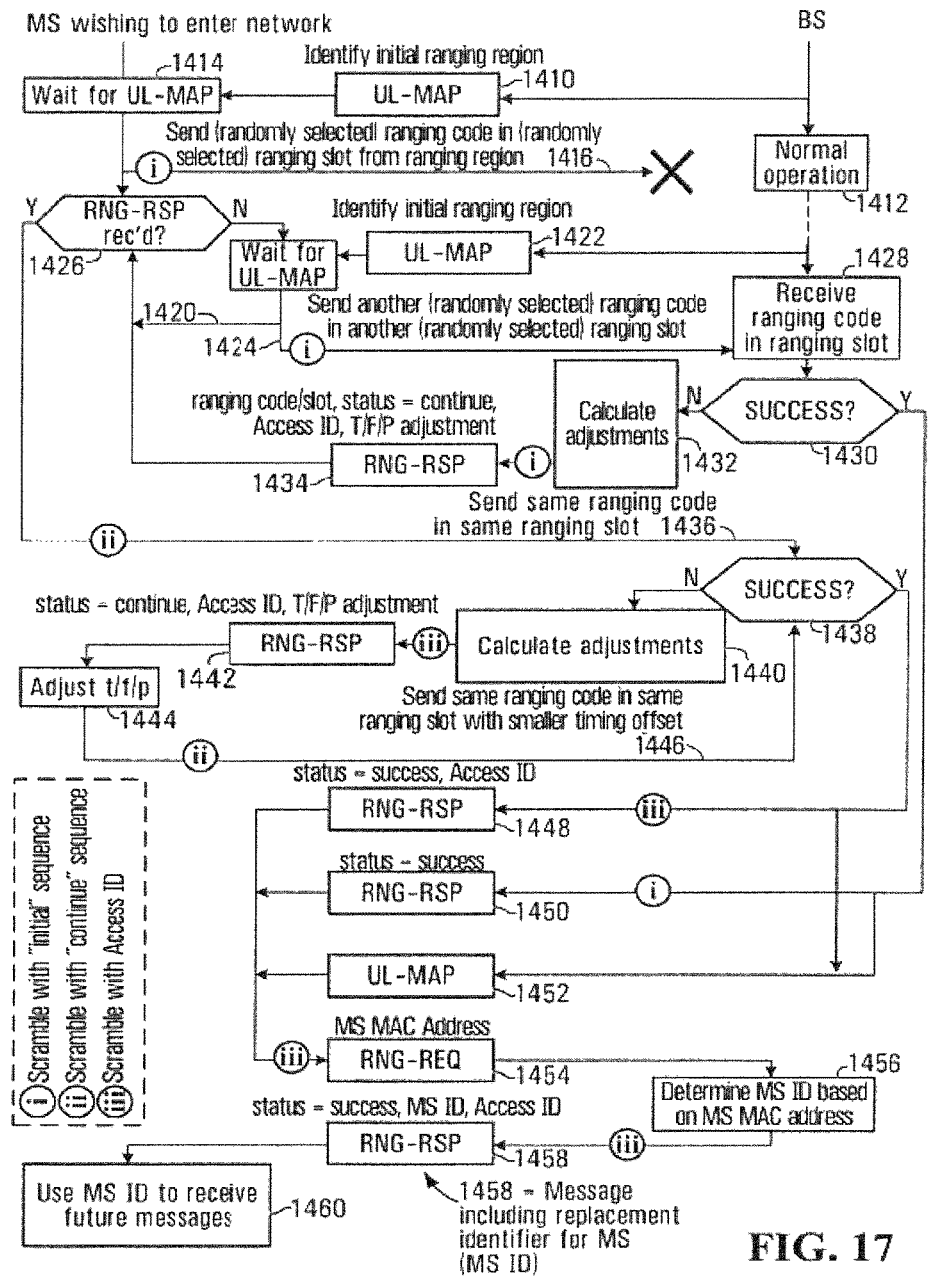
FIG. 17 shows another variant of the flow diagram in FIG. 14.

A second alternative embodiment can incorporate changes to FIG. 18 similar to those that modified the flow diagram in FIG. 17.

Scenario C

In Scenario C, the MS 16 becomes involved in a ranging operation in order to carry out a location update while in the Idle state. The location update can occur autonomously (i.e., MS-initiated) or in response to a paging message from the BS 14 while the MS 16 is in the Paging Available mode of the Idle state. Specifically, the MS in Idle mode can perform a location update process operation if one of following location update trigger conditions is met:

Paging group location update: The MS 16 performs the Location Update process when the MS 16 detects a change in paging group. The MS 16 detects the change of paging group by monitoring the Paging Group IDs, which are transmitted by the BS 14;

Timer based location update: The MS 16 periodically performs location update process prior to the expiration of idle mode timer;

Power down location update: The MS 16 attempts to complete a location update once as part of its orderly power down procedure;

Multicast/broadcast (MBS) location update: When receiving MBS data in the Idle state, during MBS zone transition, the MS 16 may perform a MBS location update process to acquire the MBS zone information for continuous reception of MBS data.

Figure 19:
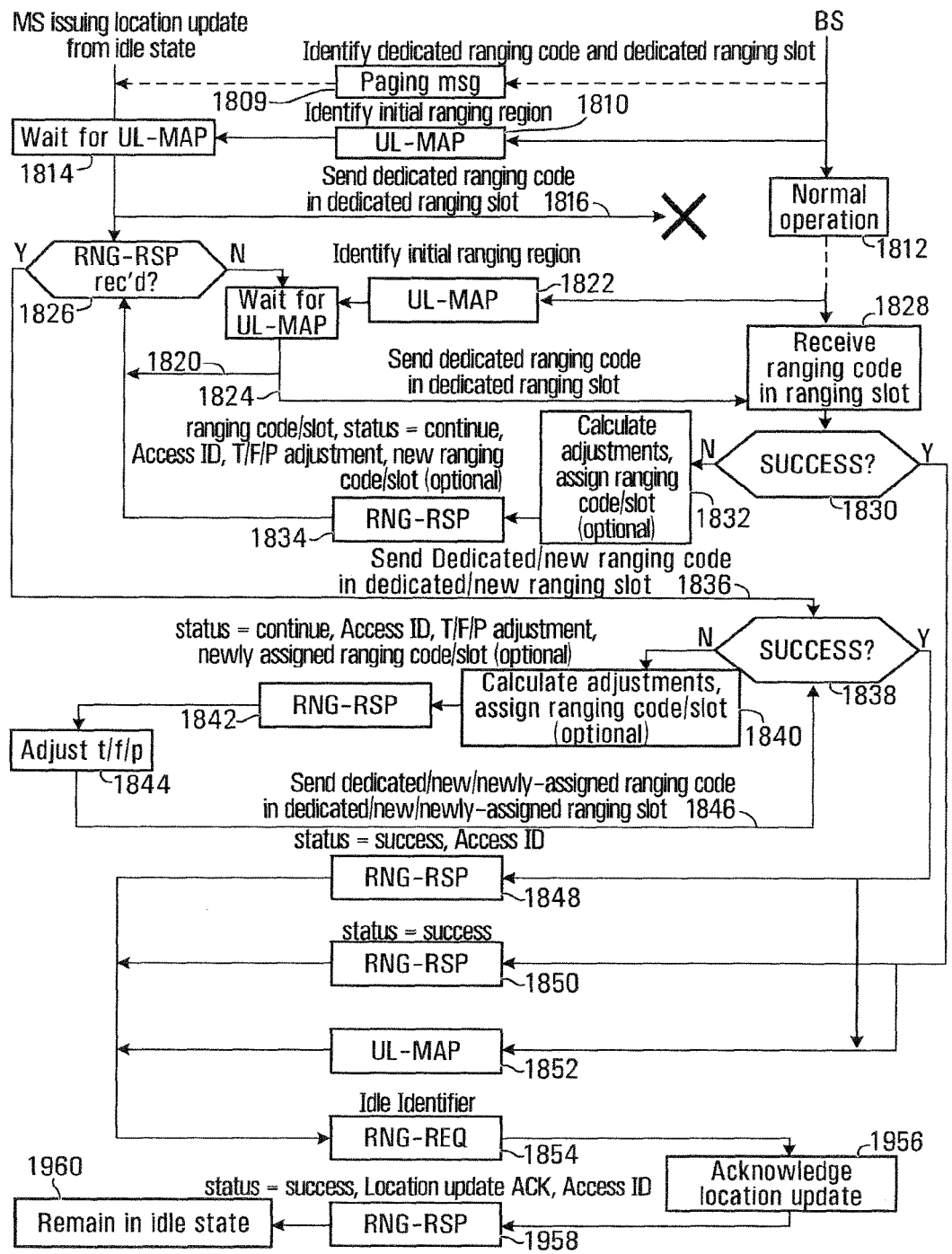
FIG. 19 is a flow diagram showing a message flow between a base station and a mobile station involved in a ranging operation therewith, in the case of a location update, in accordance with a specific non-limiting embodiment of the present invention.

Reference is now made to the flow diagram in FIG. 19, which shows the actions of the BS 14 and MS 16 while the MS 16 performs a location update while in the Idle state. Specifically, the description from reference numeral 1809 up until the point where the MS 16 issues ranging request message 1854 containing the Idle ID of the MS 16 is identical to that given above with reference to FIG. 18. The ranging request message 1854 may be also formulated to indicate that it is a location update and not occurring in the context of network entry. At step 1956, the BS 14, which is in receipt of ranging request message 1854, acknowledges the location update. This can be done by issuing a ranging response message 1958 to the MS 16, containing a location update acknowledgement, as well as the Access ID identifying the MS. The MS 16 receives the ranging response message 1958, and determines that it is the recipient of this message (based on the Access ID). With the ranging operation now complete, the MS 16 goes back into the Idle state until a further location update is required or until it is commanded to enter into the Connected state. The MS 16 uses the Idle ID in future communication with the network during the Idle state.

A first alternative embodiment can incorporate changes to FIG. 19 similar to those that modified the flow diagram in FIG. 16.

A second alternative embodiment can incorporate changes to FIG. 19 similar to those that modified the flow diagram in FIG. 17.

It should be appreciated that many variants of the above embodiments are possible. Specifically, messages may be scrambled, encoded or encrypted in any desired fashion. In particular, the scrambling techniques described with reference to FIG. 17 could be applied to any of the other message flow diagrams, in order to enhance security, reduce peak power or for other reasons.

In addition, although the above messages have been described in the context of the IEEE 802.16 and IEEE 820.16m mobile communication standards, it should be appreciated that the present invention can be more broadly applied to other communication systems, including those being implemented or designed in accordance with other mobile communication standards, such as the Long Term Evolution (LTE) standard being promulgated by the Third Generation Partnership Project (3GPP).

In addition, although the above description has focused on initial ranging using an Access ID and an MS ID, it should be appreciated that the MS 16 may effect periodic ranging using one or both of these identifiers.

In addition, although the above description has focused on a point-to-multipoint (PMP) implementation using an orthogonal frequency division multiple access (OFDMA) PHY layer, it should be appreciated that embodiments of the present invention may apply to other implementations and PHY layers, including a mesh implementation, as well as a single carrier (SC) PHY, a single-carrier access (SCa) PHY and orthogonal frequency division multiplexing (OFDM) PHY. For example, in the SC, SCa and OFDM PHY layers, rather than sending a ranging code, the MS may send a RNG-REQ message in an initial ranging interval. Also, the MAC protocol used may support Time Division Duplexing (TDD) and/or frequency division duplexing (FDD).

In addition, it should be appreciated that embodiments of the present invention can be applied to relay stations (RSs). More specifically, a RS can behave such as to allow the MS to interact as if it were interacting with a BS, while behaving such as to allow the BS to interact as if it were interacting with a MS. Meanwhile, the RS may implement one or more of the above described features with respect to initial ranging.

The foregoing figures and description provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Those skilled in the art will appreciate that in some embodiments, the MS 16 and/or the BS 14 may comprise one or more computing apparatuses that have access to a code memory (not shown) which stores computer-readable program code (instructions) for operation of the one or more computing apparatuses, thereby allowing one or more of the above described functions to be carried out. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, the MS 16 and/or the BS 14 may comprise pre-programmed hardware or firmware elements (e.g., application specific integrated circuits (ASICs), electrically erasable programmable read-only memories (EEPROMs), flash memory, etc.), or other related components that allow one or more of the above described functions to be carried out.

Additional modifications and variants are possible, and the scope of the present invention is only to be limited by the claims appended hereto.

What is claimed is:

1. A method, comprising:
    at a base station:
        generating a temporary mobile station identifier for a mobile station;
        transmitting, to the mobile station, the temporary mobile station identifier during an access procedure involving the mobile station, wherein the mobile station uses the temporary mobile station identifier to extract the contents of a first message received from the base station during the access procedure; and
        transmitting, to the mobile station, a further mobile station identifier based on a global address of the mobile station, wherein the mobile station uses the further mobile station identifier to extract the contents of a second message received from the base station.

2. The method of claim 1, further comprising:
    receiving, from the mobile station, a request to perform the access procedure, the request including a random access code.

3. The method of claim 2, wherein the generating the temporary mobile station identifier is based on the random access code.

4. The method of claim 1, wherein the contents of the second message include an uplink grant for the mobile station.

5. The method of claim 1, wherein the further mobile station identifier is generated by the Medium Access Control (MAC) layer of the base station.

6. The method of claim 1, wherein the first message further comprises at least one of a ranging code or a ranging slot previously used by the mobile station, wherein the ranging code or the ranging slot allows the mobile station to determine that the message is destined for the mobile station.

7. The method of claim 1, wherein the second message is received from the base station after the access procedure is complete.

8. The method of claim 1, wherein the second message is received from the base station during the access procedure.

9. A base station, comprising:
    a processor generating a temporary mobile station identifier during an access procedure involving a mobile station, wherein the mobile station uses the temporary mobile station identifier to extract the contents of a first message received from the base station during the access procedure and generating a further mobile station identifier based on a global address of the mobile station, wherein the mobile station uses the further mobile station identifier to extract the contents of a second message received from the base station; and
    transmit circuitry configured to output the first and second messages to the mobile station.

10. The base station of claim 9, further comprising:
    receive circuitry configured to receive a request from the mobile station to perform the access procedure, the request including a random access code.

11. The base station of claim 10, wherein the random access code is communicated to the processor which generates the temporary mobile station identifier based on the random access code.

12. The base station of claim 9, wherein the contents of the second message include an uplink grant for the mobile station.

13. The base station of claim 9, wherein the further mobile station identifier is generated by the Medium Access Control (MAC) layer being executed by the processor of the base station.

14. The base station of claim 9, wherein the second message is received from the base station after the access procedure is complete.

15. The base station of claim 9, wherein the second message is received from the base station during the access procedure.

16. A base station, comprising:
    a processor; and
    a non-transitory computer readable storage medium comprising a set of instructions, that when executed, cause the processor to perform operations comprising:
        generating a temporary mobile station identifier for a mobile station;
        transmitting, to the mobile station, the temporary mobile station identifier during an access procedure involving the mobile station, wherein the mobile station uses the temporary mobile station identifier to extract the contents of a first message received from the base station during the access procedure; and
        transmitting, to the mobile station, a further mobile station identifier based on a global address of the mobile station, wherein the mobile station uses the further mobile station identifier to extract the contents of a second message received from the base station.

17. The base station of claim 16, wherein the operations further comprise:
    receiving, from the mobile station, a request to perform the access procedure, the request including a random access code.

18. The base station of claim 17, wherein the generating the temporary mobile station identifier is based on the random access code.

19. The method of claim 16, wherein the contents of the second message include an uplink grant for the mobile station.

20. The base station of claim 16, wherein the second message is received from the base station after the access procedure is complete.

21. The base station of claim 16, wherein the second message is received from the base station during the access procedure.

* * * * *